(12) United States Patent
Araya et al.

(10) Patent No.: US 12,738,174 B2
(45) Date of Patent: Sep. 15, 2026

(54) INTERACTIVE DIGITAL LEARNING PLATFORM SYSTEM

(71) Applicants: Kristin Sardina Araya, Corte Madera, CA (US); Moshe Bercovich, Haifa (IL)

(72) Inventors: Kristin Sardina Araya, Corte Madera, CA (US); Moshe Bercovich, Haifa (IL)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

(21) Appl. No.: 18/717,245

(22) PCT Filed: Dec. 14, 2022

(86) PCT No.: PCT/US2022/052869

§ 371 (c)(1),
(2) Date: Jun. 6, 2024

(87) PCT Pub. No.: WO2023/114312

PCT Pub. Date: Jun. 22, 2023

(65) Prior Publication Data

US 2025/0046207 A1 Feb. 6, 2025

Related U.S. Application Data

(60) Provisional application No. 63/302,469, filed on Jan. 24, 2022, provisional application No. 63/289,972, filed on Dec. 15, 2021.

(51) Int. Cl.
*G09B 7/07* (2006.01)

(52) U.S. Cl.
CPC .................................... *G09B 7/07* (2013.01)

(58) Field of Classification Search
CPC ........................................................ G09B 7/07
See application file for complete search history.

(56) References Cited

U.S. PATENT DOCUMENTS

| | | | |
|---|---|---|---|
| 11,074,397 | B1 | 7/2021 | Lu et al. |
| 2007/0118794 | A1 | 5/2007 | Hollander et al. |
| 2013/0049907 | A1 | 2/2013 | Soukup |

FOREIGN PATENT DOCUMENTS

| | | |
|---|---|---|
| WO | 2013049907 A1 | 4/2013 |

OTHER PUBLICATIONS

Lee et al. “Using Time-Anchored Peer Comments to Enhance Social Interaction in Online Educational Videos”, ACM, CHI 2015. Retrieved on Feb. 16, 2023, retrieved from <URL: https://dl.acm.org/doi/pdf/10.1145/2702123.2702349.

(Continued)

*Primary Examiner* — Kesha Frisby

(74) *Attorney, Agent, or Firm* — Quarles & Brady LLP

(57) ABSTRACT

Systems and methods of the present disclosure provide for: receiving, from a first device of a first user of the plurality of users, a first user input comprising a first annotation related to the learning course content; determining a first anchor point to link the first annotation to a first portion of the learning course content; receiving, from a second device of a second user of the plurality of users, an indication of a display location of the learning course content; determining that the display location overlaps at least a part of the first portion of the learning course content; and in response to the determining that the display location overlaps at least the part of the first portion, transmitting, to the second device, the first annotation for generating a rendering of the first annotation related to the learning course content.

25 Claims, 12 Drawing Sheets

(56) References Cited

OTHER PUBLICATIONS

International Search Report and Written Opinion issued in corresponding PCT Application No. PCT/US2022/052869, mailed Mar. 31, 2023.

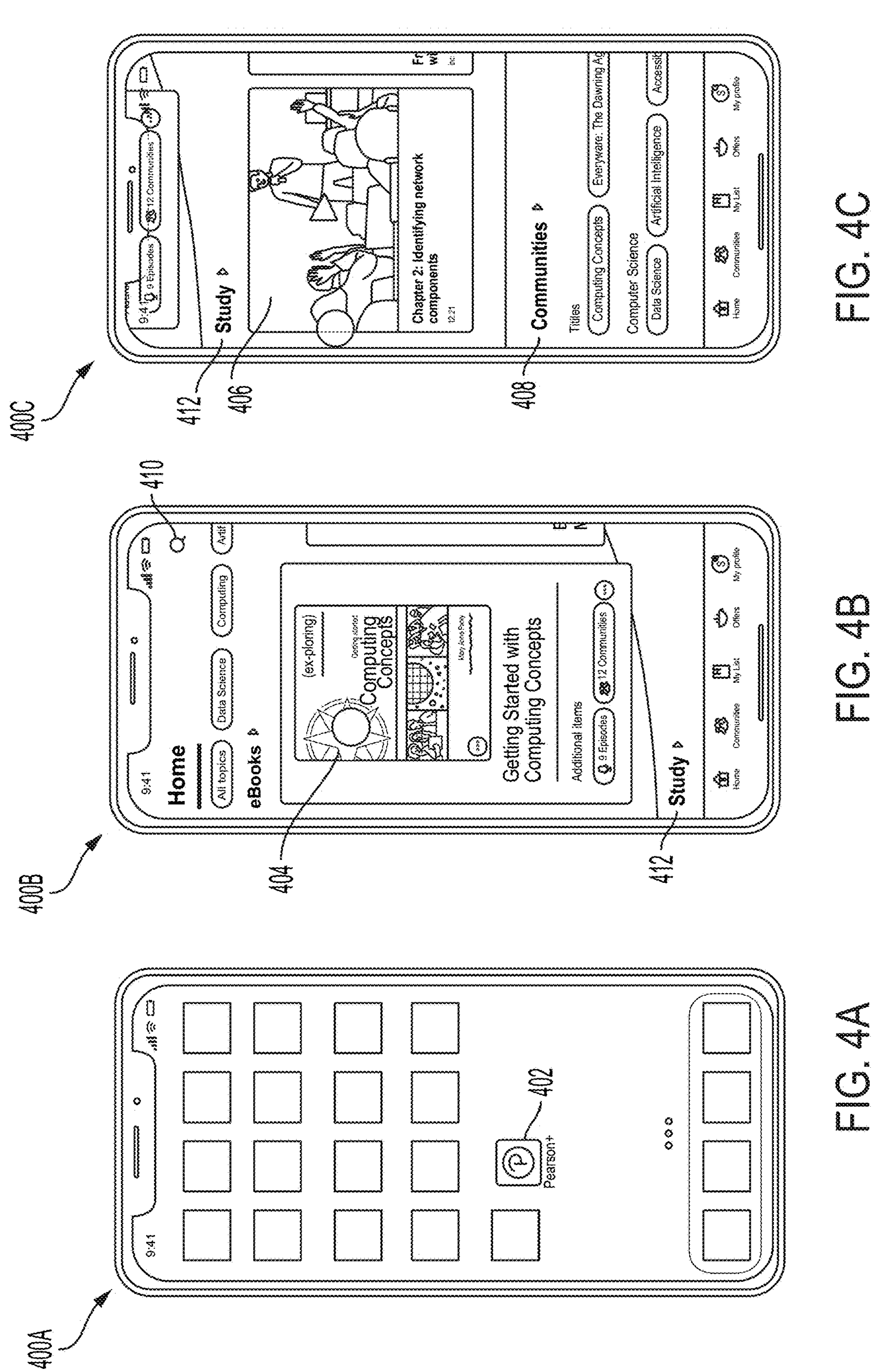

400A
9:41
Pearson+
402
FIG. 4A
400B
9:41
Home
All topics
Data Science
Computing
eBooks
(ex-ploring)
Computing Concepts
Getting Started with Computing Concepts
Additional items
9 Episodes
12 Communities
Study
Home
Communities
My List
Offers
My profile
404
410
412
FIG. 4B
400C
9:41
9 Episodes
12 Communities
Study
Chapter 2: Identifying network components
12:21
Communities
Titles
Computing Concepts
Everyware: The Dawning Ag
Computer Science
Data Science
Artificial Intelligence
Home
Communities
My List
Offers
My profile
412
406
408
FIG. 4C

INTERACTIVE DIGITAL LEARNING PLATFORM SYSTEM

CROSS-REFERENCE TO RELATED APPLICATIONS

The present application is a national stage application filed under 35 U.S.C. § 371 of International Application No. PCT/US2022/052869, filed Dec. 14, 2022, which application is based on and claims priority from U.S. Patent Application No. 63/289,972, filed on Dec. 15, 2021, and from U.S. Patent Application No. 63/302,469, filed on Jan. 24, 2022, the entire disclosure of each of which is incorporated herein by reference.

TECHNICAL FIELD

This disclosure relates to the field of systems and methods configured to generate, in real time, an annotation and a responsive annotation in a learning course content to maximize learning potential.

SUMMARY

The disclosed technology relates to systems and methods including one or more server hardware computing devices or client hardware computing devices, communicatively coupled to a network, and each including at least one processor executing specific computer-executable instructions within a memory that, when executed, cause the system to: provide a learning course content to a plurality of users; receiving, from a first device of a first user of the plurality of users, a first user input comprising a first annotation related to the learning course content; determine a first anchor point to link the first annotation to a first portion of the learning course content; receive, from a second device of a second user of the plurality of users, an indication of a display location of the learning course content; determine that the display location overlaps at least a part of the first portion of the learning course content; and in response to the determining that the display location overlaps at least the part of the first portion, transmit, to the second device, the first annotation for generating a rendering of the first annotation related to the learning course content.

The above features and advantages of the disclosed subject matter will be better understood from the following detailed description taken in conjunction with the accompanying drawings.

BRIEF DESCRIPTION OF THE DRAWINGS

FIGS. 4A-4F are schematic diagrams conceptually illustrating example screens of a graphical user interface (GUI) for an interactive digital learning platform system, in accordance with various aspects of the techniques described in this disclosure.

DETAILED DESCRIPTION

Figure 1:
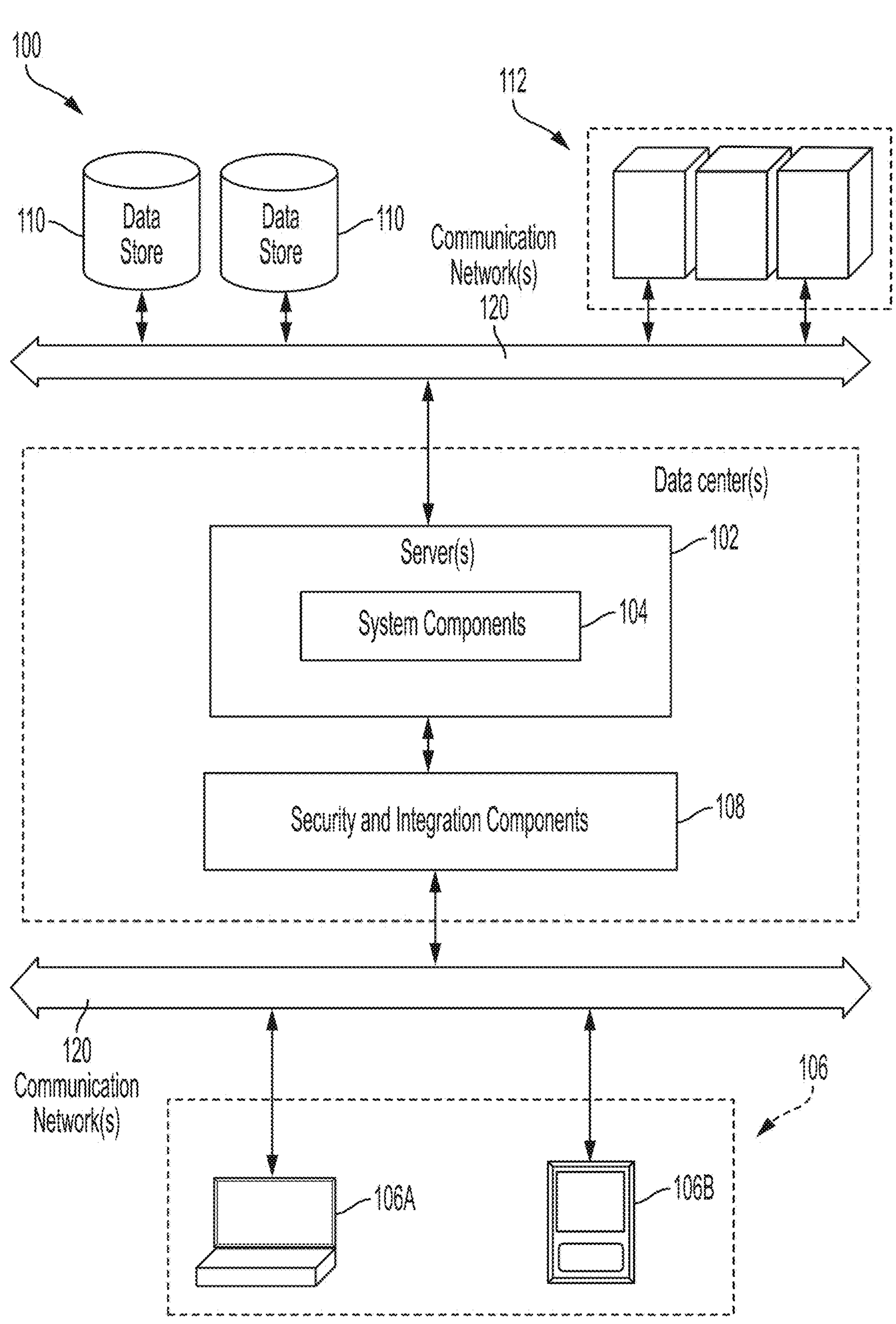
FIG. 1 illustrates a system level block diagram for providing the disclosed plugin system and pathway architecture.

The disclosed technology will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

In online learning environments in which a user (e.g., a learner user, a content creator, etc.) is presented with learning information, the content presented to the user may be limited. In such examples, a system administrator, for example, may be unable to change what a learner user sees. Further, learner users at respective client devices are not able to effectively communicate information related to particular electronic materials. In other words, systems are unable to effectively capture and share information received from a first user about particular electronic materials to one or more further users. If such content is customizable at all, it is often limited to a single method of personalizing content. As such, certain types of systems may be unable to respond to the learner user, or otherwise display personalized content, responsive to user interactivity, that is unique to that learner user.

Additionally, learner users at client devices engaged with traditional e-texts may desire or need additional information and learning content corresponding to a particular subject matter within the e-text, but which is not available in the e-text. For example, such a situation may arise when particularly complex subjects or topics arise, where a learner user is unable to successfully answer practice problems, when an exam or other project deadline is approaching and additional assistance is desired. Such learner users may exit the e-text and search other online resources, causing additional computer resource usage (e.g., network communications and local processor and memory use for searching and related activities), reduction in available graphical display area available for the e-text (e.g., from one or more new graphical user interface windows being used for other resources), more complex and disorganized display of information on the client device, a loss of user time to navigate these issues, and the like. These issues also translate into disengagement of the user, a more challenging learning environment for the user, and potentially less usage of the e-text by the user. Further, these issues may arise in time-critical situations, such as in advance of an exam or educational project deadline.

The disclosed system includes a content management system (e.g., a learning management system), including e-text, that uses back-end and in some examples, machine learning (ML) algorithms, based on stored feature data and data from other research, that are able to customize the experience for the learner, so that the content management system is able to provide customized content for a user (e.g., a learner user, a content creator, etc.). Additionally, embodiments of the disclosed system provide improved user interfaces and efficiencies for client devices. For example, by providing client devices of users with additional content associated with topics of the learning content, users may remain engaged with learning content provided by the system, avoiding the increased computer resource usage and reduction in available graphical display area available for the learning content noted above. Further, the system may provide the learning content and associated additional content in an organized manner via a single, cohesive interface to provide more information than previously provided, and to provide the information in a more timely manner, to provide the information with a more intuitive interface. Thus, for these and other reasons, embodiments disclosed herein provided improvements over existing e-text systems, online or digital learning systems, and graphical user interfaces.

FIG. 1 illustrates a non-limiting example of a distributed computing environment 100. In some examples, the distributed computing environment 100 may include one or more server(s) 102 (e.g., data servers, computing devices, computers, etc.), one or more client computing devices 106, and other components that may implement certain embodiments and features described herein. Other devices, such as specialized sensor devices, etc., may interact with the client computing device(s) 106 and/or the server(s) 102. The server(s) 102, client computing device(s) 106, or any other devices may be configured to implement a client-server model or any other distributed computing architecture. In an illustrative and non-limiting example, the client devices 106 may include a first client device 106A and a second client device 106B. The first client device 106A may correspond to a first learner user in a class and the second client device 106B may correspond to a second learner user in the class or another class.

In some examples, the server(s) 102, the client computing device(s) 106, and any other disclosed devices may be communicatively coupled via one or more communication network(s) 120. The communication network(s) 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as, e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

The embodiments shown in FIGS. 1 and/or 2 are one example of a distributed computing system and are not intended to be limiting. The subsystems and components within the server(s) 102 and the client computing device(s) 106 may be implemented in hardware, firmware, software, or combinations thereof. Various different subsystems and/or components 104 may be implemented on server 102. Users operating the client computing device(s) 106 may initiate one or more client applications to use services provided by these subsystems and components. Various different system configurations are possible in different distributed computing environments 100 and content distribution networks. Server 102 may be configured to run one or more server software applications or services, for example, web-based or cloud-based services, to support content distribution and interaction with client computing device(s) 106. Users operating client computing device(s) 106 may in turn utilize one or more client applications (e.g., virtual client applications) to interact with server 102 to utilize the services provided by these components. The client computing device(s) 106 may be configured to receive and execute client applications over the communication network(s) 120. Such client applications may be web browser-based applications and/or standalone software applications, such as mobile device applications. The client computing device(s) 106 may receive client applications from server 102 or from other application providers (e.g., public or private application stores).

As shown in FIG. 1, various security and integration components 108 may be used to manage communications over the communication network(s) 120 (e.g., a file-based integration scheme, a service-based integration scheme, etc.). In some examples, the security and integration components 108 may implement various security features for data transmission and storage, such as authenticating users or restricting access to unknown or unauthorized users. As non-limiting examples, the security and integration components 108 may include dedicated hardware, specialized networking components, and/or software (e.g., web servers, authentication servers, firewalls, routers, gateways, load balancers, etc.) within one or more data centers in one or more physical location(s) and/or operated by one or more entities, and/or may be operated within a cloud infrastructure. In various implementations, the security and integration components 108 may transmit data between the various devices in the distribution computing environment 100 (e.g., in a content distribution system or network). In some examples, the security and integration components 108 may use secure data transmission protocols and/or encryption (e.g., File Transfer Protocol (FTP), Secure File Transfer Protocol (SFTP), and/or Pretty Good Privacy (PGP) encryption) for data transfers, etc.).

In some examples, the security and integration components 108 may implement one or more web services (e.g., cross-domain and/or cross-platform web services) within the distribution computing environment 100, and may be developed for enterprise use in accordance with various web service standards (e.g., the Web Service Interoperability (WS-I) guidelines). In an example, some web services may provide secure connections, authentication, and/or confidentiality throughout the network using technologies such as SSL, TLS, HTTP, HTTPS, WS-Security standard (providing secure SOAP messages using XML encryption), etc. In some examples, the security and integration components 108 may include specialized hardware, network appliances, and the like (e.g., hardware-accelerated SSL and HTTPS), possibly installed and configured between one or more server(s) 102 and other network components. In such examples, the security and integration components 108 may thus provide secure web services, thereby allowing any external devices to communicate directly with the specialized hardware, network appliances, etc.

A distribution computing environment 100 may further include one or more data stores 110. In some examples, the one or more data stores 110 may include, and/or reside on, one or more back-end servers 112, operating in one or more data center(s) in one or more physical locations. In such examples, the one or more data stores 110 may communicate data between one or more devices, such as those connected via the one or more communication network(s) 120. In some cases, the one or more data stores 110 may reside on a non-transitory storage medium within one or more server(s) 102. In some examples, data stores 110 and back-end servers 112 may reside in a storage-area network (SAN). In addition, access to one or more data stores 110, in some examples, may be limited and/or denied based on the processes, user credentials, and/or devices attempting to interact with the one or more data stores 110.

Figure 2:
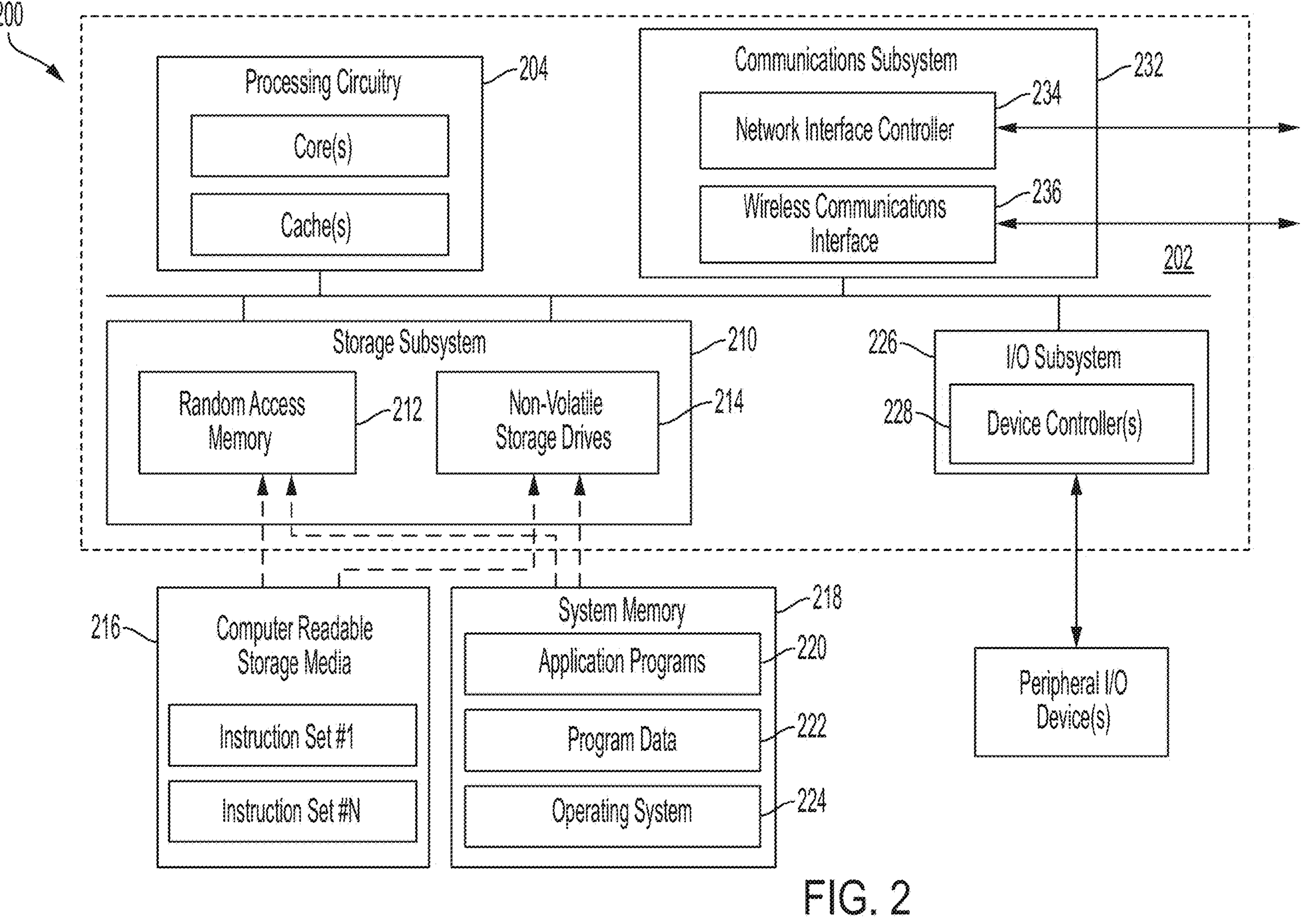
FIG. 2 illustrates a system level block diagram for providing the disclosed plugin system and pathway architecture, in accordance with various aspects of the techniques described in this disclosure.

With reference now to FIG. 2, a block diagram of an example computing system 200 is shown. The computing system 200 (e.g., one or more computers) may correspond to any one or more of the computing devices or servers of the distribution computing environment 100, or any other computing devices described herein. In an example, the computing system 200 may represent an example of one or more server(s) 102 and/or of one or more server(s) 112 of the distribution computing environment 100. In another example, the computing system 200 may represent an example of the client computing device(s) 106 of the distribution computing environment 100. In some examples, the computing system 200 may represent a combination of one or more computing devices and/or servers of the distribution computing environment 100.

In some examples, the computing system 200 may include processing circuitry 204, such as one or more processing unit(s), processor(s), etc. In some examples, the processing circuitry 204 may communicate (e.g., interface) with a number of peripheral subsystems via a bus subsystem 202. These peripheral subsystems may include, for example, a storage subsystem 210, an input/output (I/O) subsystem 226, and a communications subsystem 232.

In some examples, the processing circuitry 204 may be implemented as one or more integrated circuits (e.g., a conventional micro-processor or microcontroller). In an example, the processing circuitry 204 may control the operation of the computing system 200. The processing circuitry 204 may include single core and/or multicore (e.g., quad core, hexa-core, octo-core, ten-core, etc.) processors and processor caches. The processing circuitry 204 may execute a variety of resident software processes embodied in program code, and may maintain multiple concurrently executing programs or processes. In some examples, the processing circuitry 204 may include one or more specialized processors, (e.g., digital signal processors (DSPs), outboard, graphics application-specific, and/or other processors).

In some examples, the bus subsystem 202 provides a mechanism for intended communication between the various components and subsystems of computing system 200. Although the bus subsystem 202 is shown schematically as a single bus, alternative embodiments of the bus subsystem may utilize multiple buses. In some examples, the bus subsystem 202 may include a memory bus, memory controller, peripheral bus, and/or local bus using any of a variety of bus architectures (e.g., Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

In some examples, the I/O subsystem 226 may include one or more device controller(s) 228 for one or more user interface input devices and/or user interface output devices, possibly integrated with the computing system 200 (e.g., integrated audio/video systems, and/or touchscreen displays), or may be separate peripheral devices which are attachable/detachable from the computing system 200. Input may include keyboard or mouse input, audio input (e.g., spoken commands), motion sensing, gesture recognition (e.g., eye gestures), etc. As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like. In general, use of the term "output device" is intended to include all possible types of devices and mechanisms for outputting information from computing system 200, such as to a user (e.g., via a display device) or any other computing system, such as a second computing system 200. In an example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or may include one or more non-visual display subsystems and/or non-visual display devices, such as audio output devices, etc. As non-limiting examples, output devices may include, indicator lights, monitors, printers, speakers, headphones, automotive navigation systems, plotters, voice output devices, modems, etc.

In some examples, the computing system 200 may include one or more storage subsystems 210, including hardware and software components used for storing data and program instructions, such as system memory 218 and computer-readable storage media 216. In some examples, the system memory 218 and/or the computer-readable storage media 216 may store and/or include program instructions that are loadable and executable on the processor(s) 204. In an example, the system memory 218 may load and/or execute an operating system 224, program data 222, server applications, application program(s) 220 (e.g., client applications), Internet browsers, mid-tier applications, etc. In some examples, the system memory 218 may further store data generated during execution of these instructions.

In some examples, the system memory 218 may be stored in volatile memory (e.g., random-access memory (RAM) 212, including static random-access memory (SRAM) or dynamic random-access memory (DRAM)). In an example, the RAM 212 may contain data and/or program modules that are immediately accessible to and/or operated and executed by the processing circuitry 204. In some examples, the system memory 218 may also be stored in non-volatile storage drives 214 (e.g., read-only memory (ROM), flash memory, etc.). In an example, a basic input/output system (BIOS), containing the basic routines that help to transfer information between elements within the computing system 200 (e.g., during start-up), may typically be stored in the non-volatile storage drives 214.

In some examples, the storage subsystem 210 may include one or more tangible computer-readable storage media 216 for storing the basic programming and data constructs that provide the functionality of some embodiments. In an example, the storage subsystem 210 may include software, programs, code modules, instructions, etc., that may be executed by the processing circuitry 204, in order to provide the functionality described herein. In some examples, data generated from the executed software, programs, code, modules, or instructions may be stored within a data storage repository within the storage subsystem 210. In some examples, the storage subsystem 210 may also include a computer-readable storage media reader connected to the computer-readable storage media 216.

In some examples, the computer-readable storage media 216 may contain program code, or portions of program code. Together and, optionally, in combination with the system memory 218, the computer-readable storage media 216 may comprehensively represent remote, local, fixed, and/or removable storage devices plus storage media for temporarily and/or more permanently containing, storing, transmitting, and/or retrieving computer-readable information. In some examples, the computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by the computing system 200. In an illustrative and non-limiting example, the computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media.

In some examples, the computer-readable storage media 216 may include, but is not limited to, Zip® drives, flash memory cards, universal serial bus (USB) flash drives, secure digital (SD) cards, DVD disks, digital video tape, and the like. In some examples, the computer-readable storage media 216 may include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magneto-resistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for the computing system 200.

In some examples, the communications subsystem 232 may provide a communication interface from the computing system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally, and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 232 also may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components.

In some examples, the communications subsystem 232 may also receive input communication in the form of structured and/or unstructured data feeds, event streams, event updates, and the like, on behalf of one or more users who may use or access the computing system 200. In an example, the communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, the communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). In some examples, the communications subsystem 232 may output such structured and/or unstructured data feeds, event streams, event updates, and the like to one or more data stores that may be in communication with one or more streaming data source computing systems (e.g., one or more data source computers, etc.) coupled to the computing system 200. The various physical components of the communications subsystem 232 may be detachable components coupled to the computing system 200 via a computer network (e.g., a communication network 120), a FireWire® bus, or the like, and/or may be physically integrated onto a motherboard of the computing system 200. In some examples, the communications subsystem 232 may be implemented in whole or in part by software.

Due to the ever-changing nature of computers and networks, the description of the computing system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3:
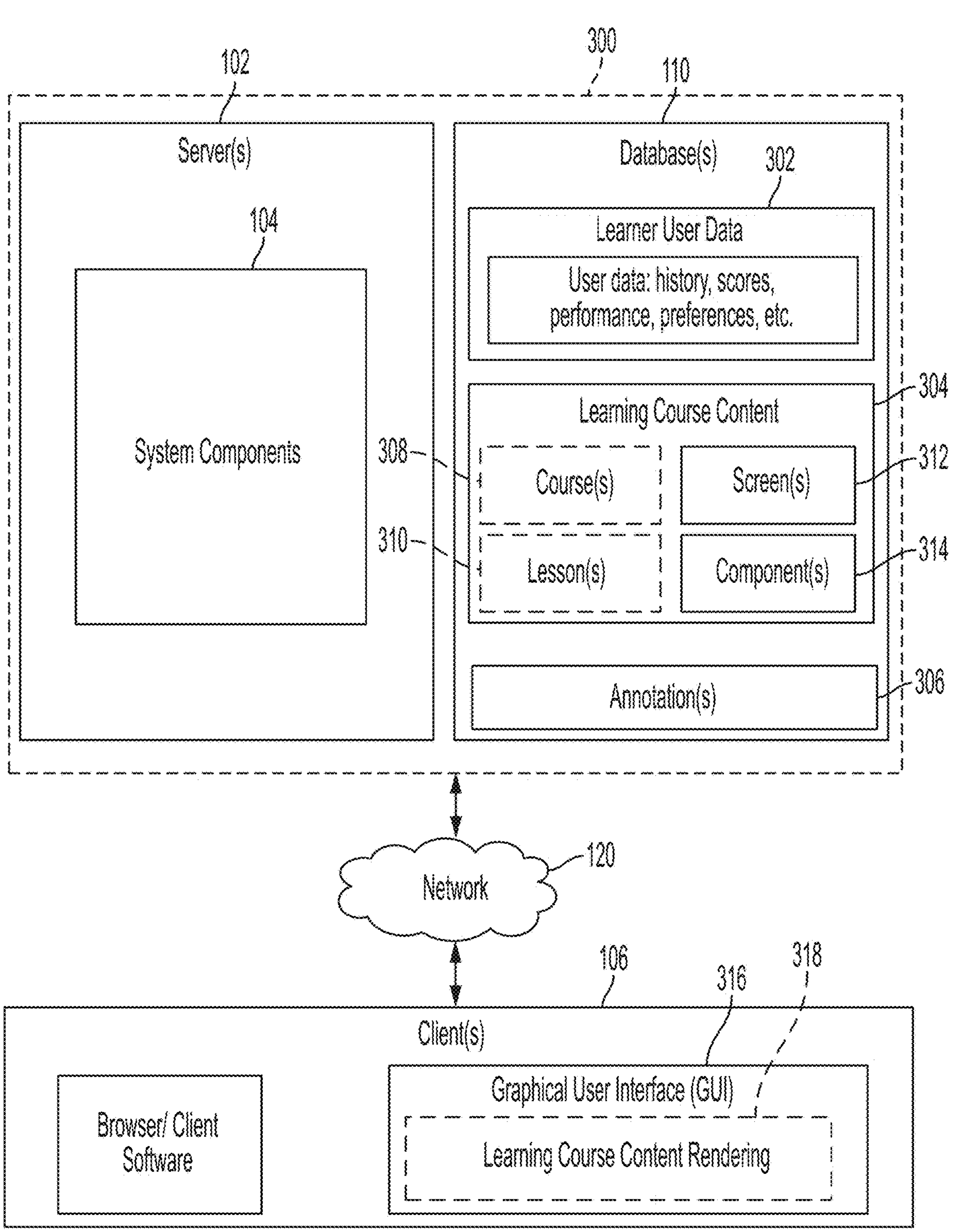
FIG. 3 illustrates a system level block diagram of a content management system that facilitates the disclosed plugin system and pathway architecture, in accordance with various aspects of the techniques described in this disclosure.

FIG. 3 illustrates a system level block diagram of an interactive digital learning platform system 300, such as a learning management system for providing the disclosed learning course content and managing annotations from users according to some examples. In some examples, the interactive digital learning platform system 300 may include one or more database(s) 110, also referred to as data stores herein. The database(s) 110 may include a plurality of user data 302 (e.g., a set of learner user data items). In such examples, the interactive digital learning platform system 300 may store and/or manage the user data in accordance with one or more of the various techniques of the disclosure. In some examples, the user data may include user responses, user history, user scores, user performance, user preferences, and the like.

In some examples, the content management system 300 may utilize the user data to make decisions (e.g., as part of a decision tree algorithm), and in some examples, the interactive digital learning platform system 300 may customize the learning experience of a particular user (e.g., a learner user). In an illustrative example, the interactive digital learning platform system 300 may utilize the user data to make decisions and/or customize a learning experience of a learner user based on user data stored in the database 110 that corresponds to that learner user. In some examples, the user data may be received by one or more users, for example, using a client computing device 106 operated by one or more learner users or content creators.

In addition, the database(s) 110 may include learning course content 304. The learning course content 304 may include an e-book (electronic version of a printed book), a document, a video, or any other suitable format of online learning content in various examples. In some examples, the learning course content 304 may further include courseware elements (e.g., courses, units, assessments, lessons, etc.). In further examples, the interactive digital learning platform system 300 may organize the courseware elements of the learning course content 304 in a hierarchy. In an example, the hierarchy may include structured data for creating one or more element(s) of the courseware architecture. In an example, a top level of the courseware architecture may include courses, units, and lessons.

In some examples, 'courses' may include one or more high-level collection(s) of 'units.' In some examples, the interactive digital learning platform system 300 may generate a suggested order of units that learner users should follow. In some examples, the content management system 300 may present the suggested order of units to a content creator.

In some examples, 'units,' also referred to as modules, may include a grouping of 'lessons' and/or 'assessments.' As with 'courses' above, the content management system 300 may generate a suggested or recommended order of lessons and assessments. In some examples, the content management system 300 may present the recommended order of lessons and assessments to a content creator.

In addition, 'lessons' may each include a set of screens designed in a specific way in order to teach a learner user one or more objectives. In an example, a 'lesson' may include a set of screens designed with targeted feedback in order to teach the learner user the one or more objectives. In some examples, the feedback may include adaptive feedback responsive to one or more interaction(s) of a learner user. 'Assessments' may include a set of screens designed in a specific way to assess the learner user's ability to meet one or more learning objectives. In some examples, these 'assessments' may include any combination of question types (e.g., true/false, multiple choice, essay, etc.). In addition, it is often the case that a 'lesson' may also be performing 'assessment' operations at the same time, and vice-versa. As such, the lines between 'lessons' and 'assessments' are often blurred. With this in mind, in some examples, 'lessons' and 'assessments' may include quiz features and/or functionality allowing learner users to navigate a set of questions in any combination of orders.

In addition, the database(s) 110 may further include annotation(s)s 306. In an illustrative and non-limiting example, the annotation may include a highlight, a post, a note, a summary, a question, an answer, a flashcard, a video, a relevant link, or a document file. In a further example, the annotation may also include a reply to another annotation.

In some aspects of the disclosure, the server 112 in coordination with the database(s) 110 may configure the system components 104 for various functions, including, e.g., providing a learning course content to multiple users, receiving a first user input including a first annotation related to the learning course content, receiving an indication of a display location of the learning course content, transmitting the first annotation for generating a rendering of the first annotation related to the learning course content, receiving a second user input comprising a second annotation related to the learning course content, and/or in response to the determination of the first portion being within the threshold distance, transmitting the second annotation for generating a rendering of the first annotation and the second annotation related to the learning course content. For example, the system components 104 may be configured to implement one or more of the functions described below in relation to FIG. 6, including, e.g., blocks 602, 604, 608, and/or 612.

In further aspects of the disclosure, the server 112 in coordination with the database(s) 110 may further configure the system components 104 for various additional functions, including, e.g., determining a first anchor point to link the first annotation to a first portion of the learning course content, determining a second anchor point to link the second annotation to a second portion of the learning course content, determining that the first portion corresponding to the first anchor point is within a threshold distance of the second portion corresponding to the second anchor point and/or determining that the display location overlaps at least a part of the first portion of the learning course content. For example, the system components 104 may be configured to implement one or more of the functions described below in relation to FIG. 6, including, e.g., blocks 606 and/or 610.

Figures 4D, 4E:
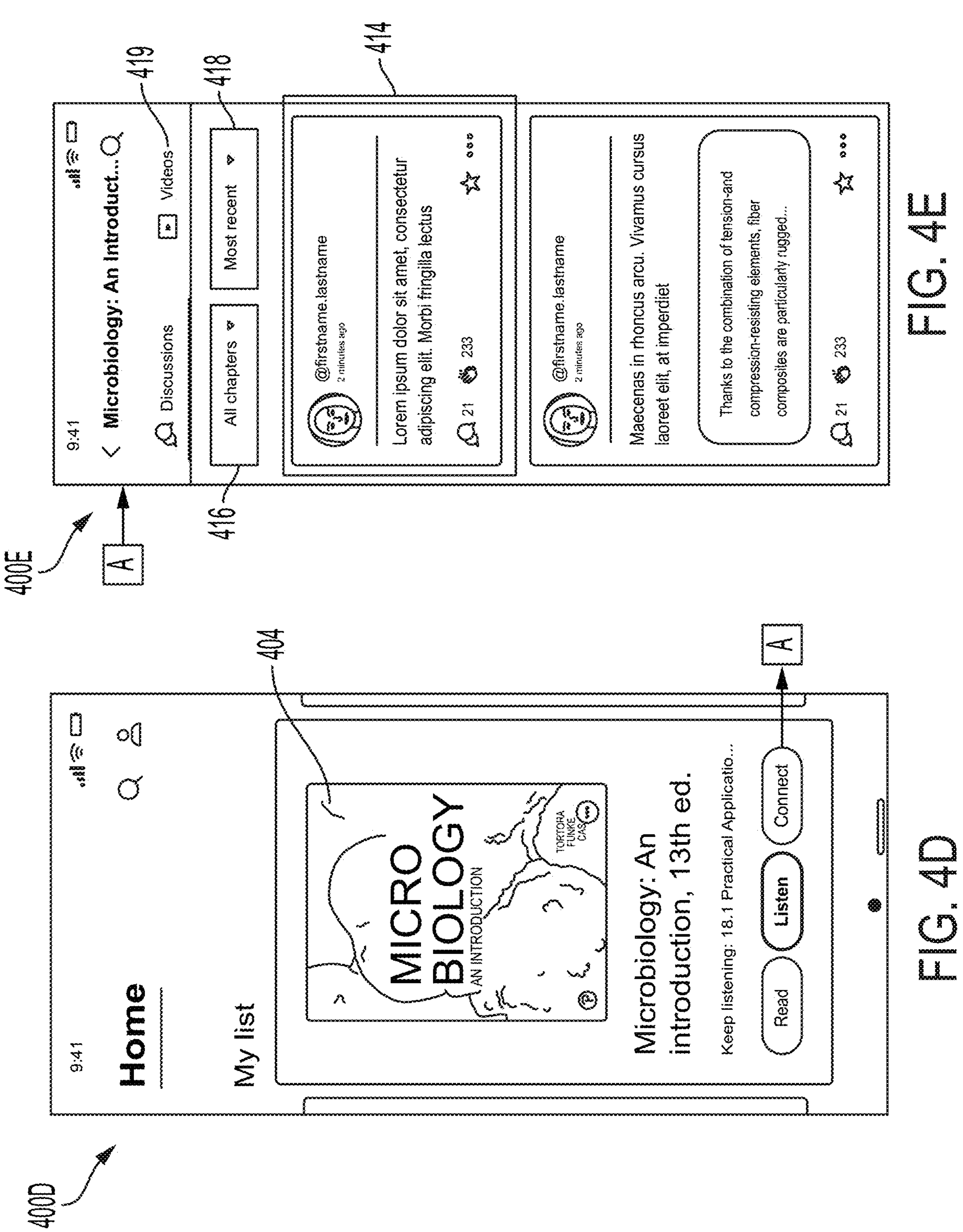

FIGS. 4A-4E are schematic diagrams conceptually illustrating example screens of a graphical user interface (GUI) for an interactive digital learning platform system, in accordance with various aspects of the techniques described in this disclosure. FIG. 4A is an example screen 400A of a graphical user interface (GUI). The example screen 400A may include an application icon 402 to run the interactive digital learning platform. In such examples, the example screen 400A may be a home screen of a mobile device. However, it should be appreciated that the interactive digital learning platform may be installed on any other suitable device. For example, the interactive digital learning platform may be installed on a laptop, a tablet, a personal computer, a server, or any other suitable computing device having a processor and a display.

FIGS. 4B and 4C are an example screen 400B of a graphical user interface (GUI) of the interactive digital learning platform at two respective vertical scrolling positions. For example, when a user selects the icon 402 of FIG. 4A to begin execution of the interactive digital learning platform software, the screen 400B shows one or more learning course contents 404. A learning course content 404 may include an e-book (electronic version of a printed book), a document, a video, or any other suitable format of online learning content. The GUI screen may show a picture of the learning course content 404. For example, the picture may include a book cover of an e-book as the learning course content 404, an instructor of the course, or any other suitable picture related to the learning course content 404. The GUI screen may also support a search feature 410. Using the search feature 410, the user may search the learning course content 404, a supplemental resource 406, a learning course, and/or an annotation.

Figure 5:
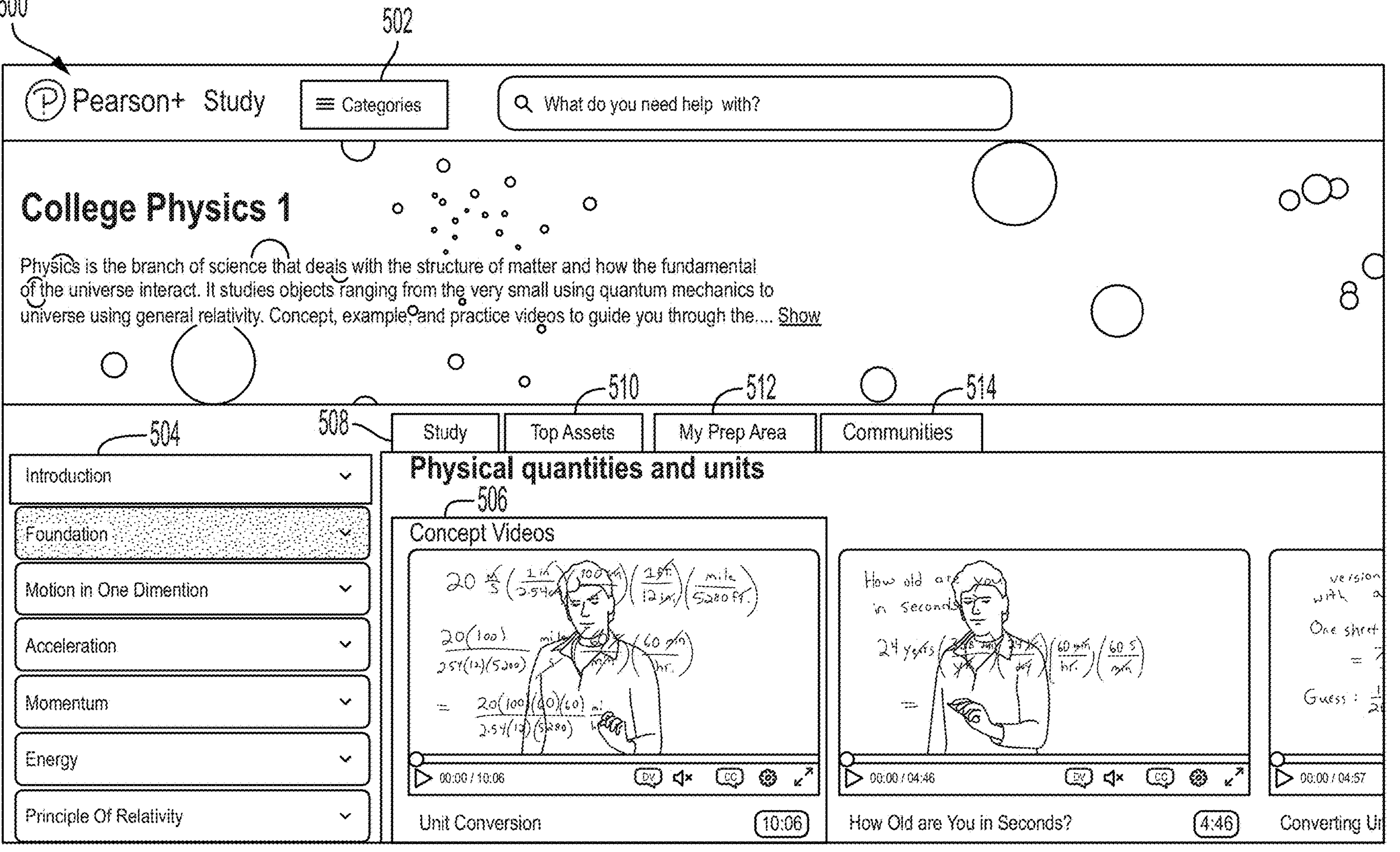
FIG. 5 is a schematic diagram conceptually illustrating another example screen of a graphical user interface (GUI) for an interactive digital learning platform system, in accordance with various aspects of the techniques described in this disclosure.

In some examples, the screen 400B may also provide one or more supplemental resources 406 related to the learning course content 404. A supplemental resource 406 may be another learning course content, an e-book, a document, a video, or any other suitable format of online learning content. The one or more supplemental resources may provide a way to access the learning course content 404. For example, the user may watch a video 406 as a supplemental resource related to a chapter of the learning course content 404 to deepen the knowledge of the chapter. The server 102 may provide a link on the video 406 to the chapter of the learning course content 404. In some scenarios, the user may be redirected to the learning course content 404 when the user clicks the video 406 or a separate button or link. In other scenarios, the server 102 may provide an additional window to show the chapter or a relevant part of the chapter in the learning course content 404. Thus, the user may watch the video 406 at one window and at the same time see the relevant part of the chapter at another window. In some examples, the screen 400B may provide a study section 412 to help the user study by topic in connection with the learning course content 404. The topic may include a basic/inclusive topic, an advanced topic, and/or a different but related topic in connection with the learning course content 404. For example, the study section 412 may include the one or more supplemental resources 406 in short-form video format to explain basic and underlying concepts in connection with the learning course content 404. For instance, the learning course content 404 is about an advanced deep learning course (e.g., Convolutional Neural Network Architecture). Then, the study section 412 may include one or more supplemental resources 406 including one or more underlying concepts (e.g., image processing basics, artificial intelligent algorithm basics, data structures, etc.) in connection with the advanced deep learning course. In further examples, the study section 412 may include one or more supplemental resources 406 including advanced topics (e.g., computer vision), which are related to the learning course content 404. In even further examples, one or more supplemental resources 406 may change depending on where the user is located in the learning course content 404. In some examples, when the user clicks the study section 406, the screen 400B may direct the user to a different screen 500 providing the one or more supplemental resources as shown in FIG. 5.

In further examples, the screen 400B may also provide one or more communities related to the learning course content 404. For example, a community 408 can include multiple posts related to the learning course content 404. In some scenarios, a post can include an annotation to the learning course content 404 and a response to the annotation. The annotation may be directly linked to the learning course content 404. The user may access the learning course content 404 by clicking the learning course content 404, a supplemental resource, or a community 408. Thus, the server 102 may provide multiple access points for accessing the learning course content 404. The community 408 may also include a discussion forum for users to ask questions, answer questions, provide useful resources related to the learning course content 404. In some examples, multiple communities can be grouped based on sub-topics (e.g., chapters, subject matters) in the learning course content 404. In other examples, a community 408 can be shared with multiple learning course content 404. For example, a community 408 discusses a broader topic than the topic of the learning course content 404. The broader topic may have the same issues as another learning course content. Then, the community 408 may be linked to another learning course content.

FIGS. 4D and 4E are example screens 400D and 400E of the interactive digital learning platform. The GUI screen 400D shows a learning course content 404 and has similar functions to those in FIG. 4B. In some examples, the learning course content 404 may include a button (e.g., "Connect) to be directed to a screen 400E (or webpage) including annotations 414 related to at least a part of the learning course content 404. In some examples, the server 102 may allow users to request that the annotations 414 being shown are limited to a part of the learning course content 404. For example, a user may select a chapter or all chapters via selector 416 (e.g., a drop-down menu of available options) to request that the server display those annotations corresponding to the selected chapter(s). In some examples, the server 102 users to request that the annotations 414 are shown a particular order via order selector 418 (e.g., a drop-down menu of available options). For example, the user may request that the server show the annotations in a chronical order or a ranking order via the order selector 418. Additionally, in response to receiving a user selection of the video button 419, the server 102 may provide a listing of available short-form videos associated with the learning content 404. These videos may similarly be listed by the server on the screen 400E in a particular order or based on chapter using selectors 416 and 418.

Figure 4F:
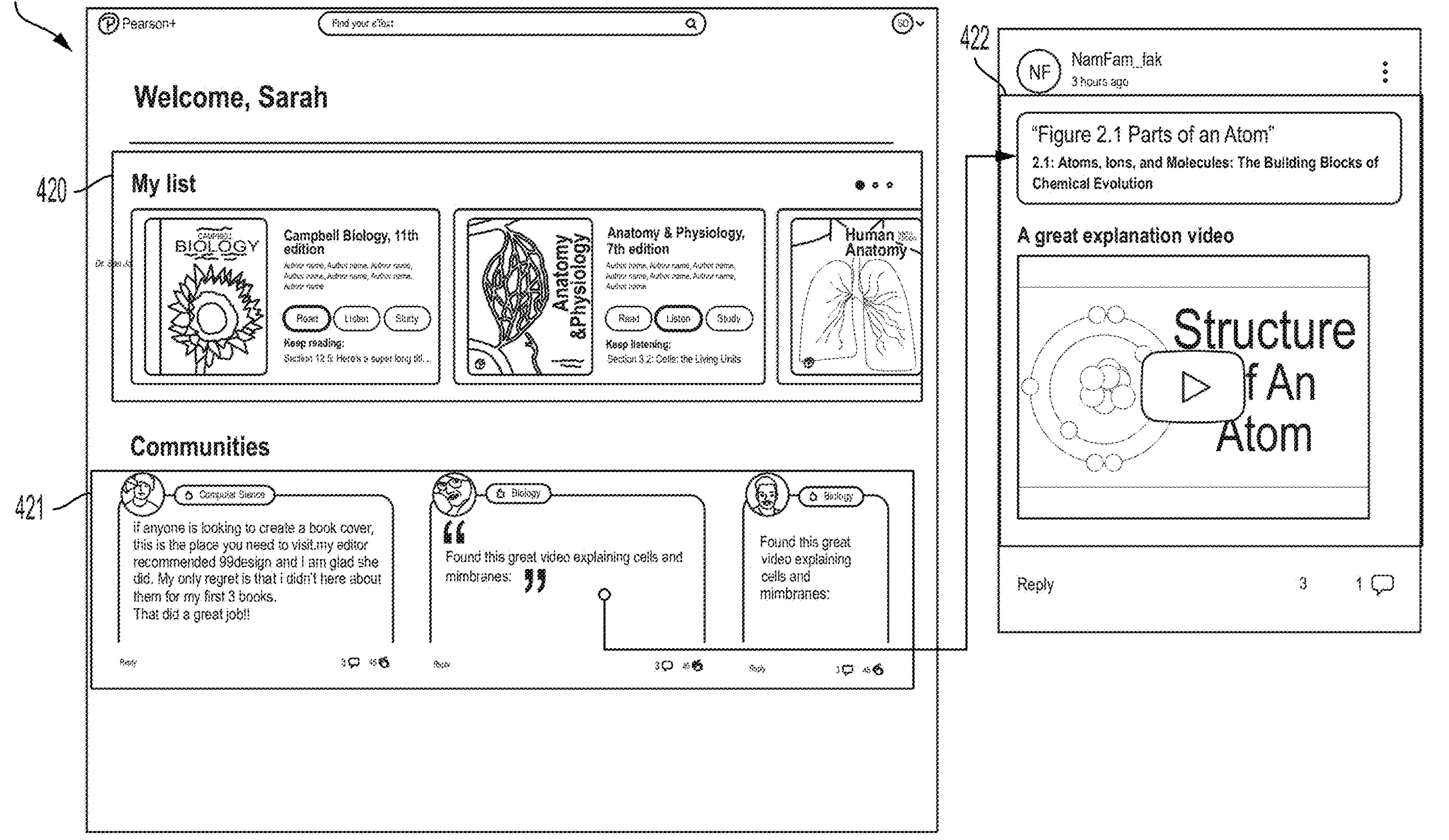

FIG. 4F is another example screen 400F of the interactive digital learning platform. In the example screen 400F, the server may cause the client device 106 of a user to show annotation links 421 at a user profile screen 400F. In response to the user clicking or selecting an annotation link 421, the server 102 may direct the user to another screen or webpage to see an annotation 422 corresponding to the annotation link 421 that was selected. In further examples, the GUI screen 400F may also include a list 420 of learning course contents 404 that the user subscribed. The list 420 may further include annotations that the user saved or liked.

FIG. 5 is another example screen 500 of a GUI for an interactive digital learning platform system, in accordance with various aspects of the techniques described in this disclosure. In some examples, while the GUI screen 400B in FIG. 4B provides a learning course content 404 (e.g., a book, etc.) and its related contents, the GUI screen 500 may provide one or more learning course contents 404, one or more supplemental resources 406, and/or one or more annotations by subject or category 502. For example, the GUI screen 500 may include multiple generic subjects (e.g., precalculus, anatomy & physiology, physics, economics, psychology) for the user to select using a drop-down menu. In an example, the user may select physics as a subject. The GUI screen 500 may provide multiple generic topics 504 for the selected subject (e.g., physics). Each topic 504 may correspond to one or more learning course contents 404, one or more supplemental resources 406, and/or one or more annotations related to the topic. Thus, in response to receiving selection of a topic 504 (e.g., from a first user of at a client 106), the server 102 may provide to the client 106 a list of one or more selectable contents 506, which correspond to the topic 504 that was selected and which may include the corresponding one or more learning course contents 404, one or more supplemental resources 406, and/or one or more annotations related to the topic. For example, the one or more selectable contents 506 may include one or more selectable short-form videos, e-books, documents, lecture video, or any other suitable format to provide educational information to the user. In some embodiments, a short-form video may include a video having a length that is less than a predetermined threshold (e.g., less than 3 minutes, less than 5 minutes, or less than 10 minutes) and that is focused on or generally limited to a particular topic of a subject.

A list of the selectable contents 506 and the order in which the server 102 displays the selectable contents 506 (e.g., on the screen 500) may be manually or automatically determined. For example, the order of display may be determined by a ranking of the selectable contents 506. A rank of a content (i.e., a learning course content 404, a supplemental resource 406, and/or an annotation) of the selectable contents 506 may be determined by one or more factors. The one or more factors may include an identity of a corresponding content creator (e.g., who receives most favorable reviews), a relevance of the content itself (e.g., how much the content is related to the topic), a number of annotations on the content, a number of "likes" (favorable feedback) received for the content, and/or a user profile (e.g., which courses the user took and/or is taking, which subject is interesting to the user, and/or which content creator's learning courses the user took the most). The server 102 may quantify a rank of a content using an equation that assigns numerical values and/or weights to one or more factors, and the server may continuously calculate and update the rankings over time. In some scenarios, the server 102 may allow users to indicate whether the users like a learning course content 404, a supplemental resource 406, and/or an annotation using a symbol. The symbol may include a clap, a thumbs-up, a smile, or any other suitable mark to indicate their favorites on the learning course content 404, the supplemental resource 406, and/or the annotation. In some instances, the server may also show the number of favorites. However, the factors to determine the rank are not limited to the list recited above.

The server 102 may further receive a selection of one of the selectable contents 506, such as one of the selectable short-form videos, from the client 106 of the first user. In response, the server 102 may provide the one of the selectable short-form videos to the client 106 of the first user for playback. For example, the server 102 may stream the video to the client 106, may transmit the video to the client 106 for later playback, or may provide the client 106 with access or credentials to access the video from another server.

In some examples, the GUI screen 500 enables a user to create and upload a short-form video. In a non-limiting example, the first user may create a short-form video to explain a topic (or topics) within a particular subject (or subjects) and to link the short-form video to the particular topic(s) and/or subject(s). In some embodiments, an additional "add video" button may be provided on the screen 500. In response to selection of this button, the user may be presented with a folder navigation screen that enables a user to navigate available video files and indicate a selection of a video (e.g., from a memory of the client 106) to be added, and/or to indicate a selection of a "create new video" option to trigger video capture via the client 106. As used herein, a "video" may refer to a combined video and audio content (e.g., combined in a video file format supporting both audio and video), or may refer to video without audio. Accordingly, the server 102 may obtain, store, index/categorize, and distribute videos among users, enabling user to create and share content with one another. Through crowd-based feedback and administrative review, such user-provided content may be ranked, enabling content viewed as desirable by the user community and/or administrators to be more easily accessible. Further, this system may result in a curated library of digital content, including short-form videos, organized by subjects and by topics within subjects.

In further examples, the GUI screen 500 enable a user to support not only study 508 by subject 502 and/or topic 504, the GUI screen 500 provides filtered contents 510, customized contents 512, annotations 514 using separate tabs. In a non-limited example, the GUI screen 500 may provide filtered contents 510 to the user using a separate tab (e.g., a "Top Assets" tab). The filtered contents may include contents having a predetermined number of favorites or likes on the contents related to the topic 504 and/or the general subject 502. In some scenarios, the filtered contents 510 may include contents selected by a content creator or a system administrator. In a further non-limited example, the GUI screen 500 may provide customized contents 512 to the user using another separate tab (e.g., a "My Prep Area" tab). The customized contents 512 may include contents that the user saved. In some scenarios, the customized contents 510 may include contents specifically selected by the user, the content creator, or the system administrator for a test. In an even further non-limited example, the GUI screen 500 may provide annotations 514 using another separate tab (e.g., a "Communities" tab). In this tab, the GUI screen 500 may show a list of annotations related to the topic 504 or the general subject 502, which form the annotations 514.

Figure 6:
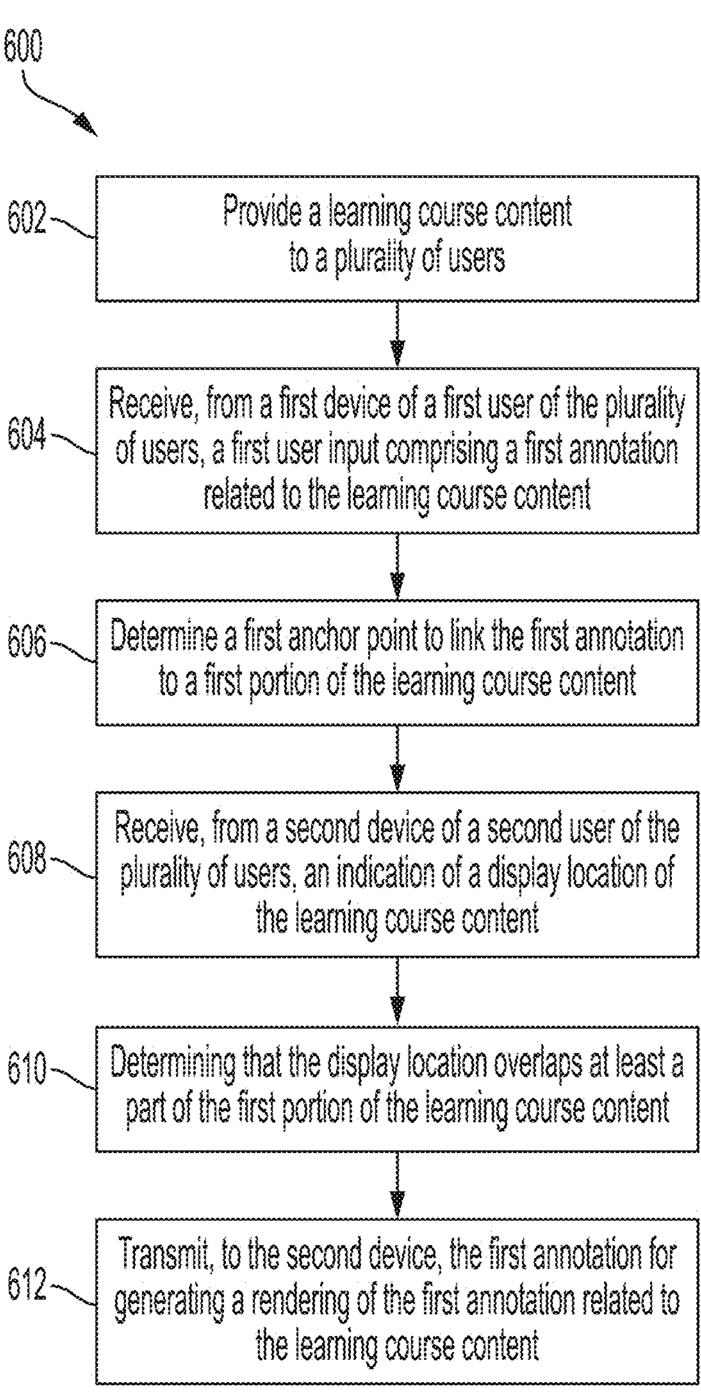
FIG. 6 is a flowchart illustrating an example method and technique for an interactive digital learning platform system, in accordance with various aspects of the techniques described in this disclosure.

FIG. 6 is a flowchart illustrating an example method and technique for an interactive digital learning platform system, in accordance with various aspects of the techniques described in this disclosure. The flowchart of FIG. 6 utilizes various GUI screens of a GUI that are described below with reference to FIGS. 7A-B and 8A-B. In some examples, the process 600 may be carried out by the server(s) 102 illustrated in FIG. 3, e.g., employing circuitry and/or software configured according to the block diagram illustrated in FIG. 2. In some examples, the process 600 may be carried out by any suitable apparatus or means for carrying out the functions or algorithm described below. In some examples, any systems and/or GUI screens are used to implement the flowchart 600. Additionally, although the blocks of the flowchart 600 are presented in a sequential manner, in some examples, one or more of the blocks may be performed in a different order than presented, in parallel with another block, or bypassed.

Figures 7A, 7B:
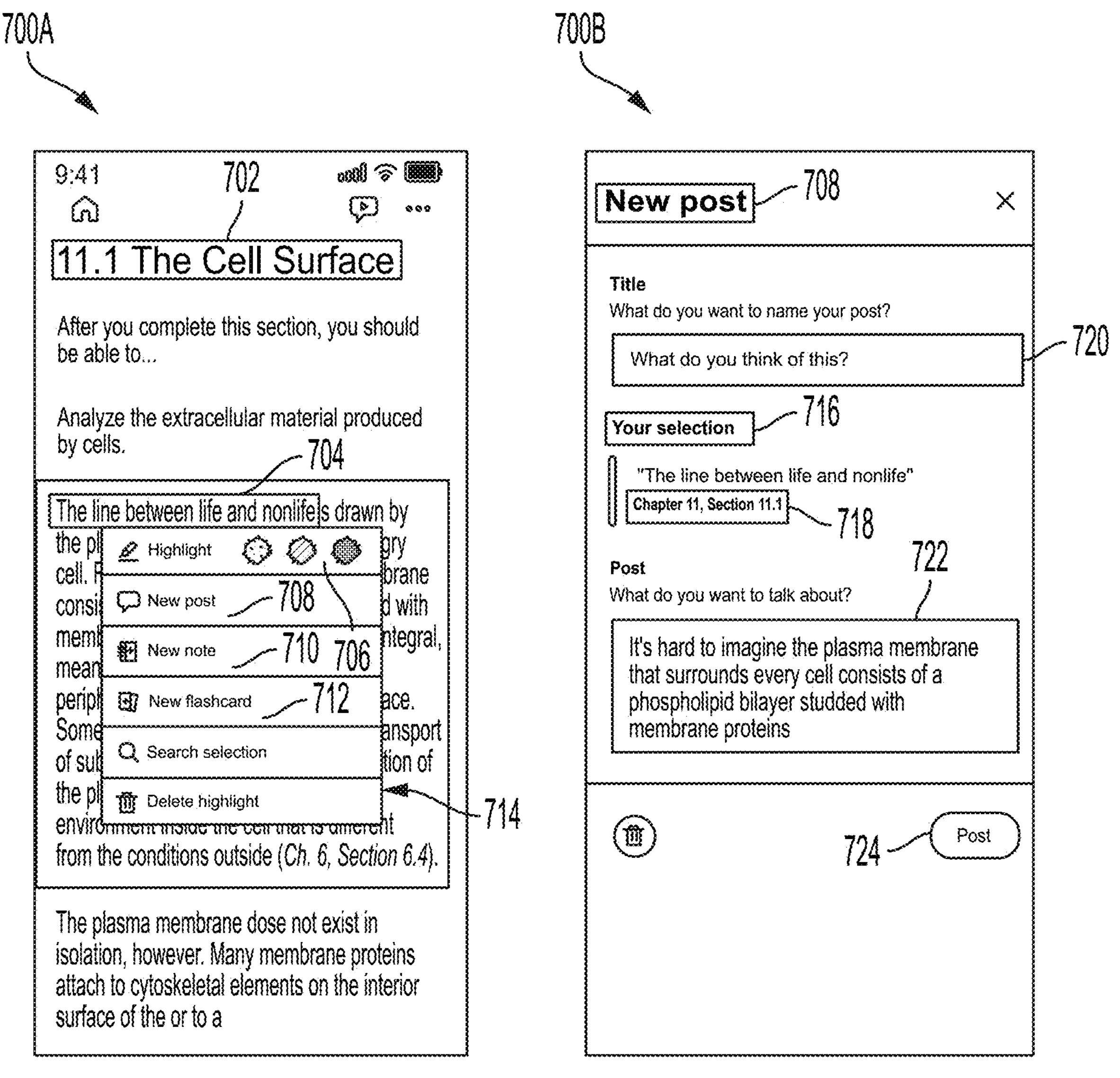
FIGS. 7A and 7B are schematic diagrams conceptually illustrating example GUI screens for adding an annotation to a learning course content, in accordance with various aspects of the techniques described in this disclosure.

At block 602, a server (e.g., one or more of the server(s) 102, also referred to as the server 102) may provide a learning course content to multiple users (e.g., multiple client devices 106). The server 102 may generate, for display on a first client device (e.g., a first client device 106), a graphical user interface (GUI) for the learning course content. In an illustrative and non-limiting example, the GUI may include a GUI screen 700A as shown in FIG. 7A. FIG. 7A illustrates an example GUI screen 700A of the learning course content 702, in accordance with various aspects of the techniques described in this disclosure. The learning course content 702 may include an e-book (electronic version of a printed book), a document, a video, or any other suitable format of online learning content. In some examples, a content creator or a qualified person may upload the learning course content 702 to the server 102. In other examples, a system administrator may upload the learning course content 702, which was created by another system (e.g., owned by a third party) to the server. In further examples, the server 102 may provide the learning course content 702 to a group of qualified users. For example, the qualified user may be a user who purchased the learning course content 702, registered for a class or a course that uses the learning course content 702, or subscribed the interactive digital learning platform. Also, the server 102 may determine an appropriate time to provide the learning course content 702. For example, the server 102 may provide the learning course content 702 immediately after the user purchased the learning course content 702. The server 102 may also, for example, provide the learning course content 702 to multiple users at a predetermined time or at the time of approval by a content creator, an instructor, an interactive digital learning platform system administrator, or any other suitable person or system that is approved to provide the learning course content 702 to the users. In some examples, the first client device 106 for the user may receive and store the entire learning course content 702 or a part of the learning course content 702 in a random access memory or non-volatile storage drives of the first client device 106. This may save the battery of the first client device 106 because first the client device 106 may disconnect from the network 120 during use of the learning course content 702. In other examples, the first client device 106 may be connected to the server 102 via the network 120 and use the learning course content 702 while first the client device 106 is connected to the network 120.

At block 604, the server 102 may receive, from a first device (e.g., the first client device 106) of a first user of the multiple users, a first user input including a first annotation related to the learning course content 702. The first client device 106 may show the GUI screen 700A including the learning course content 702. An illustrative and non-limiting example of the learning course content 702 may include an e-book shown in FIG. 700A. However, the learning course content 702 may include any other suitable format of digital learning content. For example, the learning course content 702 may include a video-based content, an audio-based content, a practice exam, and a lab. The first client device 106 may receive a selection from a user of a portion 704 of the learning course content 702 for the first annotation and add the first annotation for the portion 704 of the learning course content 702. In an illustrative and non-limiting example, the first annotation may include a highlight 704, a post 708, a note 710, a summary, a question, an answer, a flashcard 712, a video, a relevant link, a document file, a video-based content, an audio-based content, a practice exam, or a lab. For example, while the first user is reading chapter 11 and Section 11.1 of an e-book 702 (i.e., the learning course content 702) via the GUI screen 700A, the user may want to ask a question for a portion 704 ("The line between life and nonlife") of the e-book 702. The first user may select the portion 704 of the e-book 702 and create a new post 708 (i.e., the first annotation) via a dialog box 714. In some examples, the selected portion 704 may be one or more words, one or more paragraphs, one or more sections, one or more chapters, the entire learning course content 702, or any other suitable range of the learning course content 702. In some examples, a user may select the user selected portion 704 of the learning course content 702 by clicking in a beginning point of the learning course content 702, holding down a mouse button, and dragging to an end point of the learning course content. In other examples, the user may select the user selected portion 704 of the learning course content 702 by clicking in a paragraph to select the paragraphs, a selection, a chapter, or the title of the learning course content 702.

FIG. 7B, as an illustrative and non-limiting example, illustrates an example GUI screen 700B that enables creation of a new annotation 708 of the learning course content 702, in accordance with various aspects of the techniques described in this disclosure. In some scenarios, the GUI screen 700B may automatically indicate the selected portion 704 as a selected portion indication 716 of the learning course content 702. The GUI screen 700B may also show a parent category or a parent group 718 of the selected portion indication 716. For example, the GUI screen 700B may indicate a chapter, a section, a book number of a book series, and/or the title of the e-book 702 (i.e., learning course content 702). In an illustrative and non-limiting example, the new annotation 708 may include a title 720 of the post 708 and a content 722 of the annotation 708. The title 720 may be a brief heading, statement, or question for other users accessing the e-book on respective client devices to view and select. In the illustrated example, the title 720 of the annotation 708 is a briefly stated question, and the content 720 provides further explanation or detail about the question. However, the annotation 708 may have any other suitable field related to the selected portion 704. For example, the GUI screen may support creating and uploading a short-form video. In a non-limiting example, the first user may create a short-form video to explain a basic concept of the selected portion 704 on the GUI screen. The first user may be a pre-approved person who can upload a short-form video, a content creator who created the learning course content 702 or any other learning course content, and/or any other qualified person. The short-form video may be part of the learning course content 702 and/or a separate learning course content 702, which can be searched by topic. The short-form video may also be a content 506 included in a generic subject 502 as shown in FIG. 5. In some embodiments, an additional "add video" button may be provided on the new annotation 708 screen of FIG. 7B (e.g., in or near the content 722). In response to selection of this button, the user may be presented with a folder navigation screen that enables a user to navigate available video files and indicate a selection of a video (e.g., from the content 506 of the server or a memory of the client 106) to be added to the new annotation 708, and/or to indicate a selection of a "create new video" option to trigger video capture via the client 106.

After drafting the new annotation 708 of the learning course content 702, the first client device 106 of the user may send the new annotation 708 to the server 102 in response to receiving a user-selection of a submission button 724 (e.g., 'Post' button). In response, the server 102 may receive the new annotation 708 and an indication of the user selected portion 704.

Figures 8A, 8B:
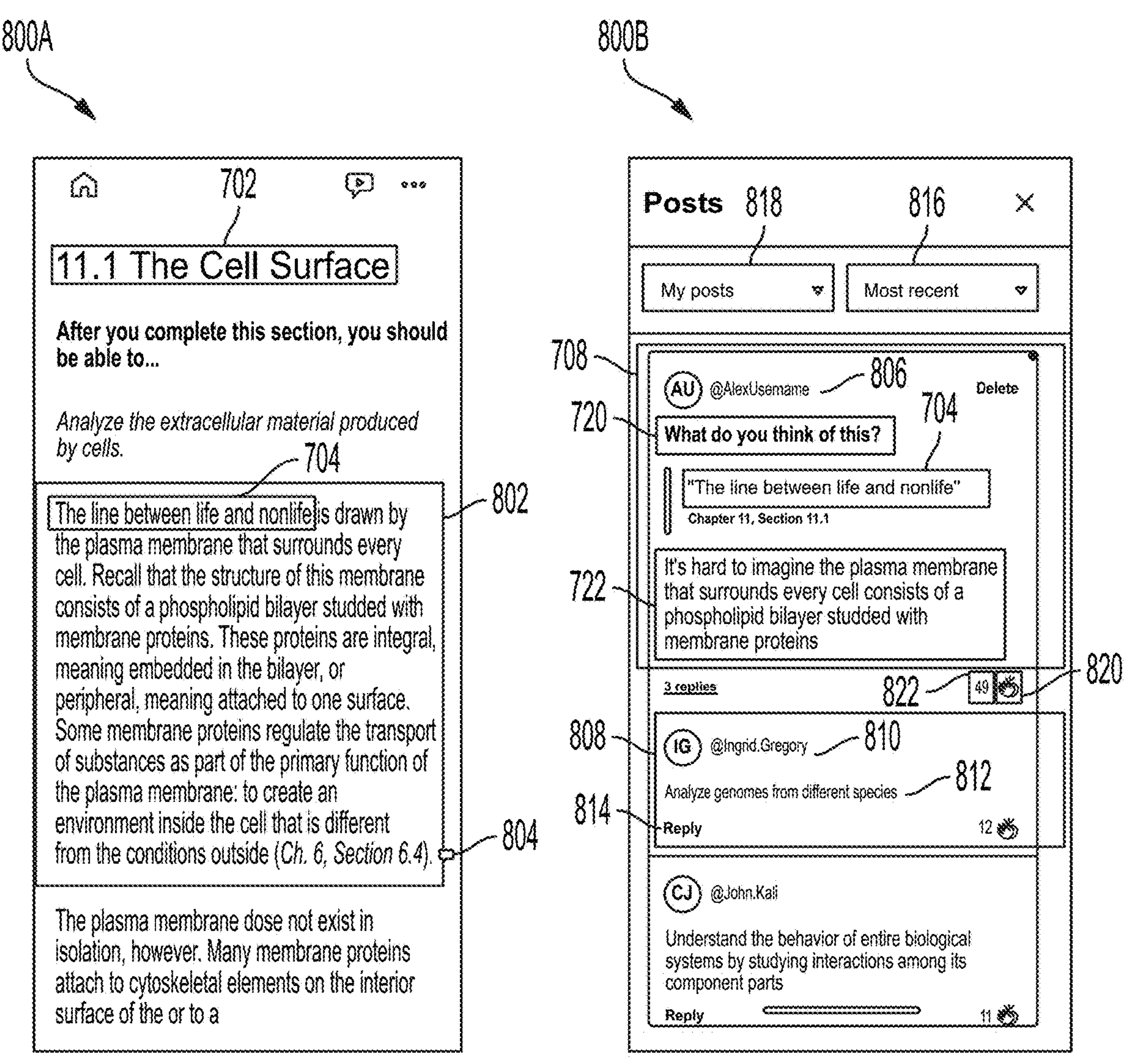
FIGS. 8A and 8B are schematic diagrams conceptually illustrating example GUI screens for viewing annotations of a learning course content, in accordance with various aspects of the techniques described in this disclosure.

At block 606, the server 102 may determine a first anchor point 804 to link the first annotation 708 to a first portion 802 of the learning course content 702. FIG. 8A, as an illustrative and non-limiting example, illustrates an example GUI screen 800A showing the learning course content 702 with an anchor point 804 for the first annotation 708. In some examples, the server 102 determines a portion of the learning course content 702 to be the first portion 802 based on the user selected portion 704 indicated by the client device 106 (indicated as described above in the preceding block 604). For example, the server 102 may determine that the first portion 802 is the user selected portion 704, or that the first portion 802 encompasses the user selected portion 704. After determining the first portion 802, the server 102 may determine an anchor point 804 within the first portion 802 to which the server 102 links the first annotation 708.

Examples of the first portion 802 and the anchor point 804 are now described in further detail below. In some examples, the first portion 802 of the learning course content 702 may be a portion of the learning course content 702 encompassing the user selected portion 704. In the example of FIG. 8A, the user selected portion 704 is several words ("The line between life and nonlife") for the first annotation 708 (e.g., post in FIG. 7B) while the first portion 802 is a paragraph including the user selected portion 704. However, the first portion 802 is not limited to this example. In some examples, the first portion 802 may include at least one of: an entire portion of the learning course content, one or more sectional portions including the second portion of the learning course content, one or more paragraphs of the learning course content, one or more words of the learning course content, a picture of the learning course content, a time of the learning course content, or the user selected portion 704 of the learning course content 702. In other scenarios, the first portion 802 of the learning course content 702 may be the same as the user selected portion 704 (e.g., the second portion) of the learning course content 702. In some instances, a paragraph of the learning course content 702, a word of the learning course content, or a picture of the learning course content for the first portion 802 may be utilized when the learning course content 702 is a document format (e.g., e-book). In other instances, a time of the learning course content 702 for the first portion 802 may be utilized when the learning course content 702 is a video-based content. For example, when the learning course content 702 is a short-form video explaining several basic concepts (e.g., three concepts) of a subject, anchor points may include time at the beginning of video (e.g., 0:00), at the end of each basic concept (e.g., 1:15, 2:50, and 4:00), at the end of the video (e.g., 5:00), or another selected time. In further examples, the first portion 802 of the learning course content 702 may not be limited to one portion of the learning course content 702. For example, although the user selected portion 704 may include a couple of words of the learning course content 702, the first portion 802 of the learning course content 702 may include more than two parent groups. Thus, in even further examples, the first portion 802 may include at least two of: a paragraph 802, a section, a chapter, or the entire portion of the learning course content 702.

The first anchor point 804 may include a predetermined point in the first portion 802 of the learning course content 702. For example, the first anchor point 804 may include the beginning of the first portion 802, the end of the first portion 802, or any predetermined point in the first portion 802 of the learning course content 702. However, it should be appreciated that the first anchor point 804 may not be limited to a predetermined point of the learning course content 702. For example, the first anchor point 804 may be a generic subject 502 and/or a topic 504 in FIG. 5. The GUI screen 800A may show the first anchor point 804 using an icon or a symbol to indicate that one or more annotations related to the first portion 802 exists. In the example illustrated above, the server 102 receives the first annotation 708 (e.g., a post) on the user selected portion 704 (e.g., a couple of words) of the learning course content 702. The server 102 may determine the first anchor point 804 (e.g., at the end 804 of the paragraph 802 including the user selected portion 704 for the post) to link the first annotation 708 (e.g., the post) to the first portion 802 (e.g. the paragraph) of the learning course content 702. In some examples, the server 102 may receive another annotation on a different portion in the same paragraph of the learning course content 702 as the paragraph including the first annotation. Then, the server 102 may determine the same anchor point for another annotation as the first anchor point 804 for the first annotation 708. Thus, the server 102 may determine the first anchor point to link another annotation to the first portion of the learning course content 702. The user may see the first annotation 708 and another annotation in the same first anchor point 804. In some examples, the first portion 802 of the learning course content 702 may be more than one portion of the learning course content 702. In the example above, the first portion 802 of the learning course content 702 may be a paragraph 802, a section, a chapter, and/or the entire portion of the learning course content 702. The first anchor point 804 may also include a predetermined point of a paragraph 802, a section, a chapter, and/or the entire portion of the learning course content 702. In some scenarios, an anchor point of the entire portion of the learning course content 702 may include all annotations for the entire portion of the learning course content 702. In further scenarios, an anchor point of a chapter of the learning course content 702 may include all annotations on any portion of the chapter of the learning course content 702.

In further examples, the first annotation 708 may include a short-form video explaining a basic or advanced concept related to the user selected portion 704. The first annotation 708 may also have an anchor point 804 related to a generic subject 502 and/or a topic 504 shown in FIG. 5 related to the content of the short-form video 506.

FIG. 8B, as an illustrative and non-limiting example, illustrates an example GUI screen 800B showing annotations corresponding to the first portion of the learning course content 702 with an anchor point 804 for the first annotation 708. For example, the first anchor point 804 may be linked to all annotations including the first annotation 708 in the first portion 802. Thus, in a later access of the learning course content after the creation of the annotation 708 and linking to the anchor point 804, when a user (e.g., the user that creates the annotation or another user) clicks an icon or symbol indicating the first anchor point 804, the server 102 causes the GUI screen 800B to show all annotations in the first portion 802. In some examples, the server 102 may show all annotations in a particular order or ranking based on a user's selected viewing option 816. For example, when the user chooses "most recent" in the viewing option 816, the server 102 may show all annotations in chronological order to show the most recent annotation on the top of the GUI screen 800B. In another example, when the user chooses "most viewed" in the viewing option 816, the server 102 may show all annotations in an order such that a most-viewed annotation is shown on the top of the GUI screen 800B. In still another example, when the user selects "most liked" in the viewing option 816, the server may show all annotations in an order such that a most-liked annotation having the most favorites or likes is shown on the top of the GUI screen 800B. In the example, the server 102 may allow user to "like" an annotation by selecting or activating a like symbol 820. The like symbol 820 may show a clap, a thumbs-up, a smile, or any other suitable mark to indicate a like for the annotation. In some scenarios, the server may also show a number of likes 822 indicating a total number of likes received for that particular annotation. In still another example, the user may select "top rank" in the viewing option 816 by ranking all annotations. The server may allow users to like (e.g., upvote) or dislike (e.g., downvote) annotations via their respective client devices 106. The server may determine a rank of an annotation based on the number of likes and dislikes received from these client devices 106. For example, the server may determine an annotation has a lower rank than a rank of another annotation having a fewer number of dislikes, or has a higher rank than another annotation having fewer likes. In some examples, the server may subtract the number of dislikes from the number of likes for each annotation, and use the result to rank the annotations (e.g., where a larger result translates to a higher ranking annotation). In another example, the server may impose more priority or weight to an annotation having more likes than dislikes. In some examples, when an annotation receives more than a predetermined number of dislikes, the server automatically hides the annotation to the public and requests a content creator, a system administrator, or any other qualified person for review. In some examples, the server may show all annotations in an order such that a most-liked annotation having the most favorites or likes is shown on the top of the GUI screen 800B. Although the user may select an option to see which annotation is shown first on the GUI screen 800B, the server may set one option as a default. In further examples, the server may show all annotations in an order considering multiple factors. For example, the server may show an annotation first, which a content creator or the author of the learning course content 702 created, and show other annotations next using one of the options described above.

In some examples, the first annotation 708 may include the user selected portion 704 (i.e., the second portion), the title 720, and/or the content 722. In further examples, the first annotation 708 may further include a username 806 indicating who authored the first annotation 708 and/or a posted date of the first annotation 708. It should be appreciated that the first annotation 708 may include any other suitable information related to a user input on the second portion of the learning course content.

At block 608, the server 102 may receive, from a second device of a second user of the plurality of users, an indication of a display location of the learning course content 702. For example, the display location may indicate a portion of the learning course content 702 on a GUI screen of the second device, which may be similar to the GUI screen 800A. This display location may indicate which page or portion of the learning course content 702 that the second device of the second user is showing. In some examples, the portion of the learning course content 702 on the GUI screen 800A may include multiple words, a few paragraphs depending on the font size of the text to be shown on the GUI screen 800A. The display location may also indicate a beginning point before the first word on the GUI screen 800A and an ending point after the last word on the GUI screen 800A. Alternatively, the display location may indicate the first word on the GUI screen 800A and the last word on the GUI screen 800A. In other examples, the display location may include a time of the learning course content (e.g., in the case of a video) where the user is in the learning course content. In some scenarios, the display location may include the entire portion of the learning course content 702. For example, the device showing the GUI screen 800A may transmit the display location as the entire portion of the learning course content 702 in a case where the device is not connected to the network to receive an annotation of the learning course content 702.

At block 610, the server 102 may determine that the display location overlaps at least a part of the first portion of the learning course content. In the example illustrated above, the GUI screen 800A of the second device may include multiple words of the e-book (i.e., the learning course content 702). The GUI screen 800A may include at least a part of the first portion of the e-book including the user selected portion 704 (i.e., the second portion) for the post 708 (i.e., the first annotation). In some examples, the server 102 may determine the overlap by identifying whether any word between the first word and the last word currently on the GUI screen 800A is included in the first portion 802 of the e-book 702.

At block 612, the server 102 may transmit, to the second device, the first annotation 708 for generating a rendering of the first annotation related to the learning course content 702. This transmission may be in response to the determination that the display location overlaps at least a part of the first portion, as determined in block 610. For example, the server 102 may send the first annotation 708 to the second device to cause the second device of the second user to show a rendering of the first annotation 708 on the GUI screen of the second device. The second user of the second device may then see the first annotation 708 posted by the first user of the first device. The rendering of the first annotation 708 may be overlaid on the learning course content 702 (e.g., with a screen having the first annotation 708 (similar to screen 800B) overlapping a portion of a screen having the learning course content (similar to the screen 800A)); shown simultaneously with the learning course content 702 (e.g., with screens similar to screens 800A and 800B shown side-by-side on the second device); or the rendering of the first annotation 708 may be provided on a new GUI screen of the second device (e.g., similar to screen 800B of FIG. 8B).

In some examples of process 600, the server 102 may further receive, from a third device of a third user of the multiple users, a second user input including a second annotation 818. In some examples, the second annotation 818 is related to the first annotation 708 of the learning course content 702. For example, the second annotation 808 may have the same anchor point 804 as the first annotation 708 and/or may have the same title as the first annotation 708. Also, the second annotation 808 may include a username 810 indicating the author of the second annotation 808, the content 812, and/or a posted date of the second annotation 808. It should be appreciated that the second annotation 808 may include any other suitable information related to a user input related to the first annotation 708. In some scenarios, the second annotation 808 may be a reply message 808 to the original post 708. For example, when a user posts a question 708 (i.e., the first annotation) for the user selected portion 704 (i.e., the second portion of the learning course content 702) of the e-book 702 (i.e., the learning course content 702), another user may respond to the question 708 using a reply message 808 (i.e., the second annotation). In further examples, the user or any other user may also respond 814 to the reply message 808 (i.e., the second annotation). In some examples, the server 102 may transmit, to the second device (and/or the first device and/or other client devices), the second annotation 808 for generating a rendering of the second annotation 808 related to the first annotation 708. Thus, the second device, which did not provide the first or second annotation, may display the first and second annotations.

In an illustrative and non-limiting example, the server 102 may further receive, from a fourth device of a fourth user of the multiple users, a third user input including a third annotation related to the learning course content. The server 102 may determine a second anchor point to link the third annotation to a third portion of the learning course content. The server 102 may determine that the first portion corresponding to the first anchor point is within a threshold distance of the second portion corresponding to the second anchor point. In response, the server 102 may transmit, to the second device, the third annotation for generating a rendering of the first annotation and the third annotation related to the learning course content.

In some examples, the server 102 uses index values to indicate locations within a learning course content. For example, each word or paragraph in an e-text may be assigned an index value, or each second (or other time period) in a video may be assigned an index value, where an index value of 0 indicates start of the learning course content 702, and a highest index value indicates an end of the learning course content 702. Accordingly, the server 102 and client devices may assign and use such index values to convey locations of portions of the learning course content, anchor points, display locations, and the like. Further, comparisons and/or arithmetic operations using associated index values may be used to determine whether certain portions overlap a display screen, are near an anchor point, or the like. For example, an index value of a first portion 802 may be compared to the starting and ending index values defining a display location, and, when the index value of the first portion 802 is within the starting and ending index values, the server 102 may determine that the first portion 802 is within the display location. Of course, in some examples, other techniques are used to indicate and define locations of components within a learning course content.

Figure 9:
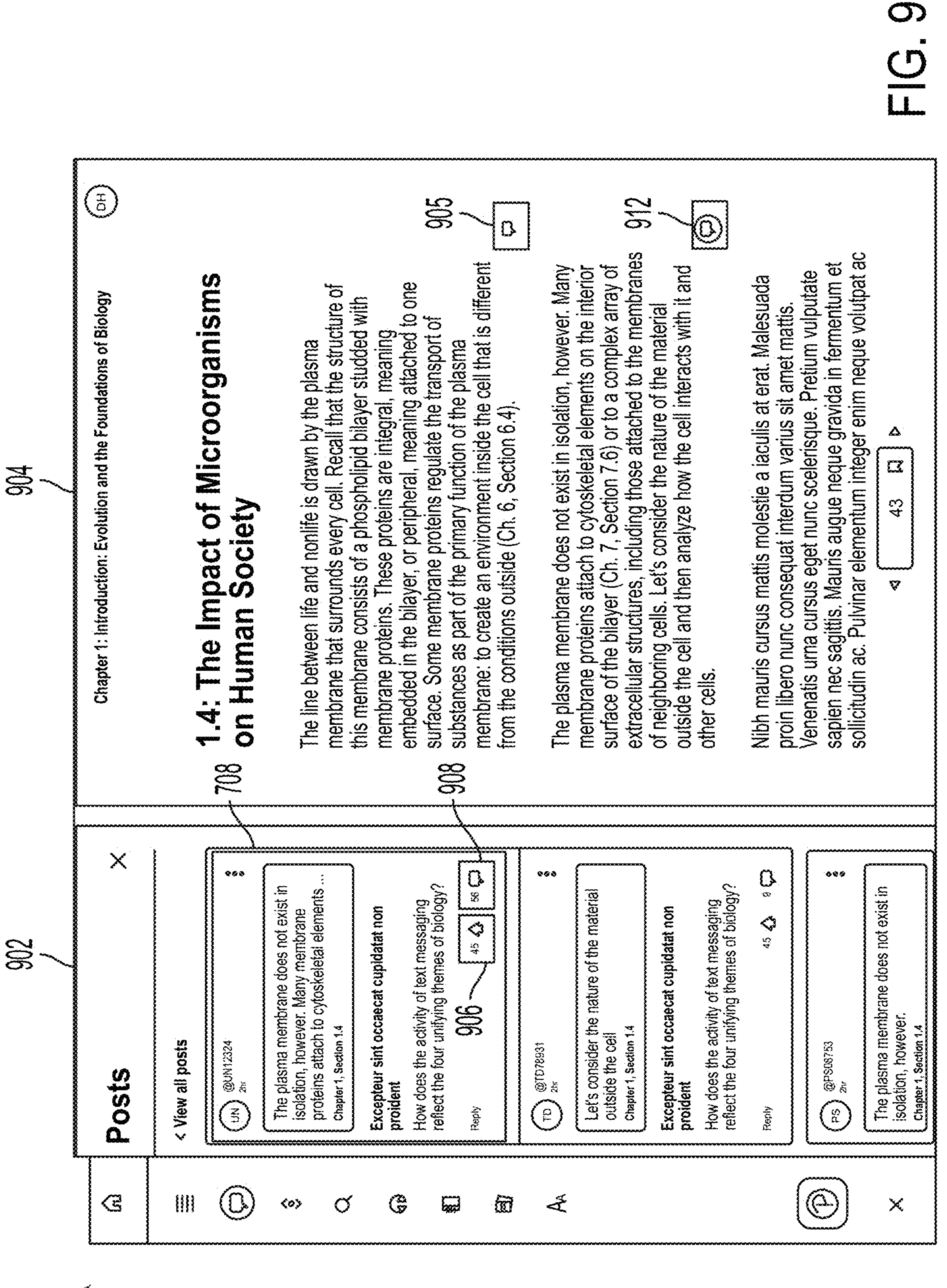
FIGS. 9 and 10 are schematic diagrams conceptually illustrating further examples of GUI screens for viewing annotations of a learning course content, in accordance with various aspects of the technique described in this disclosure.
Figure 10:
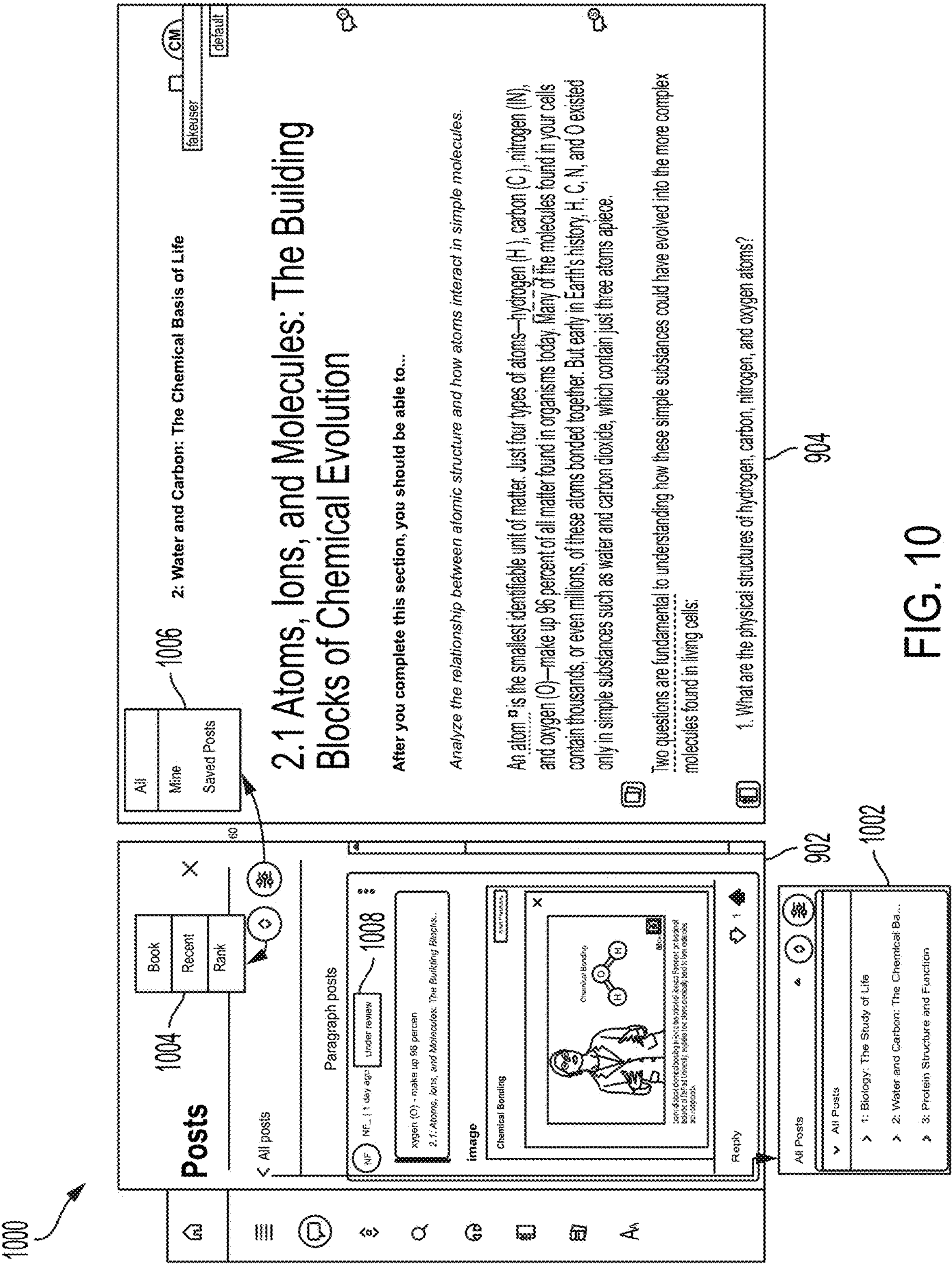

FIGS. 9 and 10 are schematic diagrams conceptually illustrating further example GUI screens for viewing annotations of a learning course content, in accordance with various aspects of the techniques described in this disclosure. In at least some embodiments, the GUI screens illustrated in FIGS. 9 and 10 provide desktop mode screens adapted for larger display screen devices (e.g., for a laptop computer, a desktop computer, a tablet computer, or another suitable device). Still, in some embodiments, these screens may also be displayed on devices having smaller screens, such as smart phones. The GUI screens 900 and 1000 of FIGS. 9 and 10, respectively, may incorporate similar functionality as the GUI screens illustrated in FIGS. 8A and 8B, as described above, as well as additional features, which are described in further detail below.

In FIG. 9, the GUI 900 may include an annotation window 902 adjacent to a learning course content 904. Here, the learning course content 904 is shown as an e-text, but, as described herein, may take other forms (e.g., short-form videos, practice exams, simulated labs, etc.). The server 102 may cause the GUI 900 to include the annotation window 902 in response to selection of an annotation icon 905. In some examples, the server 102 may display the annotation icon 905 within the learning course content 904 to indicate the existence of annotations (e.g., notations 708) for a paragraph, a chapter, a whole book, a part of a video, a whole video, and/or a another portion of the learning course content 904. The annotations for a particular learning course content, such as the content 904, may be received by the server 102 using various techniques described above (e.g., with respect to FIGS. 7A, 7B, 8A, and 8B) and also via the GUI 900 using similar techniques. The annotation icon 905 may be correspond to an anchor point for an annotation and may be positioned adjacent to or in the vicinity of the anchor point. For example, when there are one or more annotations for a portion in the first paragraph of the learning course content 904, the server 102 may show the icon 905 at the end of the paragraph (i.e., an example anchor point). In response to receiving a user selection of the icon 905 from a client device, the server 102 may cause the display of the annotation window 902 on the GUI 900.

The annotation window 902 may illustrate all or a subset of the annotations associated with the icon 905. The server 102 may cause a particular annotation within the annotation window 902, such as annotation 708, to be displayed along side the number of "likes" or "upvotes" 906, the number of "dislikes" or "downvotes," and/or the number of replies 908 (second annotations 808 in FIG. 8B) that the server 102 has received for the annotation 708. The server 102 may determine the order of annotations to be shown in the annotation window 902 based on the number of "likes" 906, the number of replies 908, or another ranking of annotations. In some example, the server 102 may determine all annotations or a subset of annotations associated with the anchor point to be shown on the GUI screen 900. For example, the subset may include the annotations that the server 102 deems the most popular, highest ranked, approved by a qualified person (e.g., a system administrator, a moderator, and/or a content creator), with a ranking above a certain threshold (e.g., most recent), or another qualification. In some examples, the server 102 may show replies grouped by an annotation 708 within the annotation window 902. For example, in response to selection of the replies 908 by a user via a client device, the server 102 may show the replies in a nested conversation format to illustrate the relationship between the original annotation (e.g., annotation 708) and the associated replies 908.

In some examples, a particular annotation icon displayed in the learning course content 904 of the GUI 900 may further indicate the number of annotations associated with the particular anchor point. For example, when two or more annotations are about a certain paragraph or correspond to the same anchor point of the learning course content 904, the server 102 may show an annotation icon 912 with a different color at the end of the paragraph (i.e., an anchor point), or with a number indicating the number of original annotations and/or a sum of the original annotations and replies. In response to receiving a user selection of the icon 912 from a client device, the server 102 may cause the display of the annotation window 902 on the GUI 900 with all or a subset of the annotations associated with the icon 912 (e.g., organized and/or rank-ordered according to the various techniques described above). Although the annotations shown in the annotation window 902 are text-based, as described above, these annotations may also take the form of a video, image, audio, or other media format.

In FIG. 10, the server 102 may allow a user to select annotations to be presented in the GUI screen 1000. For example, the server 102 may show sections 1002 of the learning course content. In some examples, the user may select one of the sections 1002 and, in response, the server 102 causes the GUI screen 1000 to show all (or a subset) of the annotations in the learning course content 904 with anchor points associated with the selected section 1002. In further examples, the server 102 may show options for a listing order via order selector 1004, which may include listing annotations based on rankings or uploaded times. Also, the server 102 may selectively show annotations based on a user setting 1006. For example, the server 102 may limit the displayed annotations to those annotations that were created by the user or saved by the user. In further examples, the server 102 may hold annotations 1008 when users upload them until a qualified person (a system administrator, a moderator, a content creator, etc.) approves the annotations. Thus, when the user uploads an annotation, the annotation is shown under review 1008 and is not shown to the public until approved by a qualified person.

In some examples, the server 102 may receive an annotation created by a user from a client device (e.g., using one of the aforementioned techniques), and, before making the annotation accessible to other users, provide the annotation to a moderator device for review (e.g., along with an associated portion of the associated learning content). The server 102 may then receive a posting decision from moderator device indicating whether to permit annotation or deny annotation. Then, the server 102 permits or denies the annotation in response to the posting decision. This technique allows moderation of annotations that may be added to prevent annotations that do not meet quality or content standards for the system.

In some examples, the server 102 may receive an improper annotation report by a user from a client device. In response, the server 102 may provide the alleged improper annotation to a moderator device for review (e.g., along with an associated portion of the associated learning content). The server 102 may then receive a posting decision from moderator device indicating whether to permit the annotation or deny the annotation. Then, the server 102 may permit or deny inclusion of the annotation in response to the posting decision. This technique allows moderation of annotations and removal of annotations that do not meet quality or content standards for the system.

In an example, the systems and methods described herein (e.g., the interactive digital learning platform system 300, the method 600, etc.) enable an efficient technique for managing and sharing annotations such that the system may efficiently record annotations from client devices and locations in learning course content to which the annotations are associated, and determine when and which annotations to share among remote client devices. Such networked sharing of electronic annotations across client devices provides an improved content management system at least in that additional electronic resources (e.g., annotations) are able to be created by remotely-located client devices, shared among these client devices, and linked to specific portions of the content, thereby improving the electronic organization and distribution of the content. The interactive digital learning platform system 300 may further improve the user interface on a client device by preventing the display of undesired or irrelevant annotations (preventing a cluttered display) and providing the display of desired or relevant annotations, in light of the current content on the display screen of the client device. At the same time, the display of desired or relevant annotations reduces unnecessary battery use of the client device and the network resource usage due to the minimum access to the network. In addition, the systems and methods enable the creation, sharing, and displaying of desired or relevant annotations associated with learning course in real-time (e.g., seemingly instantaneous, immediate but for network-related communication delays, within a few seconds). Further, the creation, sharing, and displaying of desired or relevant annotations enriches and adapts the learning course content, making the interactive digital platform constantly changing and evolving with the addition of materials provided at relevant locations or times.

Further Examples Having a Variety of Features

The disclosure may be further understood by way of the following examples:

Example 1: Example 1: A method, apparatus, and non-transitory computer-readable medium for providing a learning course content to a plurality of users; receiving, from a first device of a first user of the plurality of users, a first user input comprising a first annotation related to the learning course content; determining a first anchor point to link the first annotation to a first portion of the learning course content; receiving, from a second device of a second user of the plurality of users, an indication of a display location of the learning course content; determining that the display location overlaps at least a part of the first portion of the learning course content; and in response to the determining that the display location overlaps at least the part of the first portion, transmitting, to the second device, the first annotation for generating a rendering of the first annotation related to the learning course content.

Example 2: The method, apparatus, and non-transitory computer-readable medium according to Example 1, further comprising: receiving, from a third device of a third user of the plurality of users, a second user input comprising a second annotation related to the learning course content; determining a second anchor point to link the second annotation to a second portion of the learning course content; determining that the first portion corresponding to the first anchor point is within a threshold distance of the second portion corresponding to the second anchor point; and in response to the determination of the first portion being within the threshold distance, transmitting, to the second device, the second annotation for generating a rendering of the first annotation and the second annotation related to the learning course content.

Example 3: The method, apparatus, and non-transitory computer-readable medium according to any of Examples 1 or 2, wherein the first portion of the learning course content comprises at least one of: an entire portion of the learning course content, a sectional portion including the second portion of the learning course content, a paragraph of the learning course content, a word of the learning course content, a picture of the learning course content, or a time of the learning course content.

Example 4: The method, apparatus, and non-transitory computer-readable medium according to any of Examples 1-3, wherein the first annotation is received on a second portion of the learning course content, and wherein the second portion of the learning course content is equal to or part of the first portion of the learning course content.

Example 5: The method, apparatus, and non-transitory computer-readable medium according to any of Examples 1-4, wherein the first anchor point includes a predetermined point in the first portion of the learning course content.

Example 6: The method, apparatus, and non-transitory computer-readable medium according to any of Examples 1-5, further comprising: providing a plurality of access points for accessing the learning course content.

Example 7: The method, apparatus, and non-transitory computer-readable medium according to any of Examples 1-6, further comprising: receiving, from a third device of a third user of the plurality of users, a second user input comprising a second annotation related to the first annotation of the learning course content.

Example 8: The method, apparatus, and non-transitory computer-readable medium according to any of Examples 1-7, wherein the second annotation has a same anchor point as the first annotation.

Example 9: The method, apparatus, and non-transitory computer-readable medium according to any of Examples 1-8, further comprising: transmitting, to the second device, an indication of the first user.

Example 10: The method, apparatus, and non-transitory computer-readable medium according to any of Examples 1-9, wherein the first annotation includes a video related to the learning course content.

Example 11: The method, apparatus, and non-transitory computer-readable medium according to any of Examples 1-10, further comprising: receiving, from the first device, a selection of a subject and a topic of the subject; providing, to the first device, a listing of selectable contents corresponding to the topic and ranked for display in a particular order based on one or more factors, the listing of selectable contents including a plurality of selectable short-form educational videos; receiving a selection of one of the selectable short-form videos; and providing the one of the selectable educational videos to the first device for playback.

Example 12: The method, apparatus, and non-transitory computer-readable medium according to any of Examples 1-11, wherein the one or more factors comprises at least one of: a number of favorable feedback for the learning course content, a number of annotations on the learning course content, a content creator of the learning course content, or a user profile.

Other examples and uses of the disclosed technology will be apparent to those having ordinary skill in the art upon consideration of the specification and practice of the invention disclosed herein. The specification and examples given should be considered as examples, and it is contemplated that the appended claims will cover any other such embodiments or modifications as fall within the true scope thereof.

The Abstract accompanying this specification is in no way intended for defining, determining, or limiting the present application or any of its embodiments, claimed now or in the future.

What is claimed is:

1. A method for an interactive digital learning platform system, the method comprising:

providing a learning course content to a plurality of users;

receiving, from a first device of a first user of the plurality of users, a first user input comprising a first annotation related to the learning course content;

determining a first anchor point to link the first annotation to a first portion of the learning course content;

receiving, from a second device of a second user of the plurality of users, an indication of a display location of the learning course content;

determining that the display location overlaps at least a part of the first portion of the learning course content; and in response to the determining that the display location overlaps at least the part of the first portion, transmitting, to the second device, the first annotation for generating a rendering of the first annotation related to the learning course content.

2. The method of claim 1, further comprising:

receiving, from a third device of a third user of the plurality of users, a second user input comprising a second annotation related to the learning course content;

determining a second anchor point to link the second annotation to a second portion of the learning course content;

determining that the first portion corresponding to the first anchor point is within a threshold distance of the second portion corresponding to the second anchor point; and in response to the determination of the first portion being within the threshold distance, transmitting, to the second device, the second annotation for generating a rendering of the first annotation and the second annotation related to the learning course content.

3. The method of claim 1, wherein the first portion of the learning course content comprises at least one of: an entire portion of the learning course content, a sectional portion including a second portion of the learning course content, a paragraph of the learning course content, a word of the learning course content, a picture of the learning course content, or a time of the learning course content.

4. The method of claim 1, wherein the first annotation is received on a second portion of the learning course content, and wherein the second portion of the learning course content is equal to or part of the first portion of the learning course content.

5. The method of claim 1, wherein the first anchor point includes a predetermined point in the first portion of the learning course content.

6. The method of claim 1, further comprising:

providing a plurality of access points for accessing the learning course content.

7. The method of claim 1, further comprising:

receiving, from a third device of a third user of the plurality of users, a second user input comprising a second annotation related to the first annotation of the learning course content.

8. The method of claim 7, wherein the second annotation has a same anchor point as the first annotation.

9. The method of claim 1, further comprising:

transmitting, to the second device, an indication of the first user.

10. The method of claim 1, wherein the first annotation includes a video related to the learning course content.

11. The method of claim 1, receiving, from the first device, a selection of a subject and a topic of the subject;

providing, to the first device, a listing of selectable contents corresponding to the topic and ranked for display in a particular order based on one or more factors, the listing of selectable contents including a plurality of selectable short-form educational videos;

receiving a selection of one of the selectable short-form videos; and providing the one of the selectable educational videos to the first device for playback.

12. The method of claim 11, wherein the one or more factors comprises at least one of: a number of instances of favorable feedback for the learning course content, a number of annotations on the learning course content, a content creator of the learning course content, or a user profile.

13. A system for an interactive digital learning platform, comprising: a database storing:

a plurality of learning course contents;

a server in communication with the database and including a computing device coupled to a network and including at least one processor executing instructions within a memory which, when executed, cause the system to:

provide a learning course content of the plurality of learning course contents to a plurality of users;

receive, from a first device of a first user of the plurality of users, a first user input comprising a first annotation related to the learning course content;

determine a first anchor point to link the first annotation to a first portion of the learning course content;

receive, from a second device of a second user of the plurality of users, an indication of a display location of the learning course content;

determine that the display location overlaps at least a part of the first portion of the learning course content; and in response to the determining that the display location overlaps at least the part of the first portion, transmit, to the second device, the first annotation for generating a rendering of the first annotation related to the learning course content.

14. The system of claim 13, wherein the at least one processor and the memory are further configured to:

receive, from a third device of a third user of the plurality of users, a second user input comprising a second annotation related to the learning course content;

determine a second anchor point to link the second annotation to a second portion of the learning course content;

determine that the first portion corresponding to the first anchor point is within a threshold distance of the second portion corresponding to the second anchor point; and in response to the determination of the first portion being within the threshold distance, transmit, to the second device, the second annotation for generating a rendering of the first annotation and the second annotation related to the learning course content.

15. The system of claim 13, wherein the first portion of the learning course content comprises at least one of: an entire portion of the learning course content, a sectional portion including a second portion of the learning course content, a paragraph of the learning course content, a word of the learning course content, a picture of the learning course content, or a time of the learning course content.

16. The system of claim 13, wherein the first annotation is received on a second portion of the learning course content, and wherein the second portion of the learning course content is equal to or part of the first portion of the learning course content.

17. The system of claim 13, wherein the first anchor point includes a predetermined point in the first portion of the learning course content.

18. The system of claim 13, wherein the at least one processor and the memory are further configured to:

provide a plurality of access points for accessing the learning course content.

19. The system of claim 13, wherein the at least one processor and the memory are further configured to:

receive, from a third device of a third user of the plurality of users, a second user input comprising a second annotation related to the first annotation of the learning course content.

20. The system of claim 19, wherein the second annotation has a same anchor point as the first annotation.

21. The system of claim 13, wherein the at least one processor and the memory are further configured to:

transmit, to the second device, an indication of the first user.

22. The system of claim 13, wherein the first annotation includes a video related to the learning course content.

23. The system of claim 13, wherein the at least one process and the memory are further configured to:

receive, from the first device, a selection of a subject and a topic of the subject;

provide, to the first device, a listing of selectable contents corresponding to the topic and ranked for display in a particular order based on one or more factors, the listing of selectable contents including a plurality of selectable short-form educational videos;

receive a selection of one of the selectable short-form videos; and provide the one of the selectable educational videos to the first device for playback.

24. The system of claim 13, wherein the one or more factors comprises at least one of: a number of favorable feedback for the learning course content, a number of annotations on the learning course content, a content creator of the learning course content, or a user profile.

25. The method of claim 1, wherein the first annotation is displayed on a second GUI of the second device.

* * * * *